US011716699B2

(12) United States Patent
Ibrahim et al.

(10) Patent No.: US 11,716,699 B2
(45) Date of Patent: Aug. 1, 2023

(54) TIMING ADVANCE ADJUSTMENTS IN A FULL-DUPLEX MULTI-TRANSMIT-RECEIVE POINT CONFIGURATION

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/323,646

(22) Filed: May 18, 2021

(65) Prior Publication Data
US 2022/0377689 A1   Nov. 24, 2022

(51) Int. Cl.
*H04W 56/00* (2009.01)
*H04W 8/24* (2009.01)
(Continued)

(52) U.S. Cl.
CPC ............ *H04W 56/005* (2013.01); *H04L 5/14* (2013.01); *H04L 27/2607* (2013.01); *H04W 8/24* (2013.01)

(58) Field of Classification Search
None
See application file for complete search history.

(56) References Cited

U.S. PATENT DOCUMENTS

| 2017/0150523 | A1* | 5/2017 | Patel | H04W 74/008 |
| 2019/0036559 | A1* | 1/2019 | Wu | H04J 11/0023 |

(Continued)

FOREIGN PATENT DOCUMENTS

| EP | 2019509 A1 | 1/2009 | |
| EP | 3297343 A2 * | 3/2018 | ........ H04W 56/0015 |

(Continued)

OTHER PUBLICATIONS

International Search Report and Written Opinion—PCT/US2022/072369—ISA/EPO—dated Sep. 9, 2022.

*Primary Examiner* — Peter Chen
*Assistant Examiner* — Jeff Banthrongsack
(74) *Attorney, Agent, or Firm* — Harrity & Harrity, LLP

(57) ABSTRACT

A user equipment (UE), such as a full-duplex UE, may receive a downlink transmission from a first transmit-receive point (TRP) in a full-duplex multi-TRP configuration. The UE may perform an uplink transmission to a second TRP in the full-duplex multi-TRP configuration based at least in part on a timing advance adjustment associated with the uplink transmission. The UE may apply the timing advance adjustment based at least in part on an indication received from a base station. The indication may be to set a timing advance offset to a value that satisfies a threshold value based at least in part on the downlink transmission and the uplink transmission being associated with two different TRPs. The downlink transmission and the uplink transmission may not be separated by a guard symbol when the downlink transmission and the uplink transmission are associated with the two different TRPs, which may improve a resource utilization.

30 Claims, 21 Drawing Sheets

(51) Int. Cl.
*H04L 27/26* (2006.01)
*H04L 5/14* (2006.01)

(56) References Cited

U.S. PATENT DOCUMENTS

2019/0387470 A1* 12/2019 Nam .................... H04W 72/14
2020/0092068 A1* 3/2020 Yang .................... H04L 5/0044

FOREIGN PATENT DOCUMENTS

| EP | 3297343 A2 | 3/2018 | |
| WO | WO-2018143846 A1 * | 8/2018 | ........ H04W 56/0015 |
| WO | 2020194103 A1 | 10/2020 | |

* cited by examiner

| | |
|---|---|
| PDCCH | 0 |
| GAP | 1 |
| PUSCH | 2 |
| | 3 |
| | 4 |
| | 5 |
| | 6 |
| | 7 |
| | 8 |
| | 9 |
| | 10 |
| | 11 |
| | 12 |
| SRS | 13 |

TIMING ADVANCE ADJUSTMENTS IN A FULL-DUPLEX MULTI-TRANSMIT-RECEIVE POINT CONFIGURATION

FIELD OF THE DISCLOSURE

Aspects of the present disclosure generally relate to wireless communication and to techniques and apparatuses for timing advance adjustments in a full-duplex multi-transmit-receive point (TRP) configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a TRP, a 5G BS, a 5G Node B, or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the 3GPP. 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In a full-duplex multi-TRP configuration, a UE may communicate with a first TRP and a second TRP. For example, the UE may transmit a first physical uplink shared channel (PUSCH) to the first TRP in slot n, and the UE may transmit a second PUSCH to the second TRP in slot n+1. The first PUSCH and the second PUSCH may be PUSCH repetitions. The UE may dynamically switch between the first TRP and the second TRP when performing the PUSCH repetitions. In some cases, the UE may receive a timing advance command in slot n, and the UE may adjust an uplink transmission timing based at least in part on the timing advance command in slot n+k+1. In other words, the UE may need k slots to apply a timing advance adjustment. In this case, the UE may be unable to apply the timing advance adjustment for the second PUSCH transmitted to the second TRP in slot n+1. The k slots needed to apply the timing advance adjustment may not be suitable when the UE dynamically switches between the first TRP and the second TRP.

In various aspects of techniques and apparatuses described herein, a UE (e.g., a full-duplex UE) may receive a physical downlink control channel (PDCCH) from a first TRP in a full-duplex multi-TRP configuration. The UE may perform a PUSCH transmission to a second TRP in the full-duplex multi-TRP configuration based at least in part on a timing advance adjustment associated with the uplink transmission. In some aspects, the UE may apply the timing advance adjustment based at least in part on an indication received from a base station. For example, the UE may receive, from the base station, an indication to set a timing advance offset to a value that satisfies a threshold value based at least in part on the downlink transmission and the uplink transmission being associated with two different TRPs. The UE may set the timing advance offset during the timing advance adjustment. The downlink transmission and the uplink transmission may not be separated by a guard symbol based at least in part on the downlink transmission and the uplink transmission being associated with the two different TRPs, which may improve a resource utilization. Further, the UE may perform the timing advance adjustment, such that a downlink-uplink misalignment between the downlink transmission and the uplink transmission may be less than a cyclic prefix length, which may reduce a level of self-interference at the UE.

In some aspects, a UE for wireless communication includes a memory and one or more processors, coupled to the memory, configured to: receive a downlink transmission from a first TRP in a full-duplex multi-TRP configuration; and perform an uplink transmission to a second TRP in the full-duplex multi-TRP configuration based at least in part on a timing advance adjustment associated with the uplink transmission.

In some aspects, a method of wireless communication performed by a UE includes receiving a downlink transmission from a first TRP in a full-duplex multi-TRP configuration; and performing an uplink transmission to a second TRP in the full-duplex multi-TRP configuration based at least in part on a timing advance adjustment associated with the uplink transmission.

In some aspects, a non-transitory computer-readable medium storing a set of instructions for wireless communication includes one or more instructions that, when executed by one or more processors of a UE, cause the UE to: receive a downlink transmission from a first TRP in a full-duplex multi-TRP configuration; and perform an uplink transmission to a second TRP in the full-duplex multi-TRP configuration based at least in part on a timing advance adjustment associated with the uplink transmission.

In some aspects, an apparatus for wireless communication includes means for receiving a downlink transmission from a first TRP in a full-duplex multi-TRP configuration; and means for performing an uplink transmission to a second TRP in the full-duplex multi-TRP configuration based at least in part on a timing advance adjustment associated with the uplink transmission.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIG. 13 is a diagram illustrating an example of a slot having a guard symbol for switching from a downlink to an uplink.

DETAILED DESCRIPTION

Figure 1:
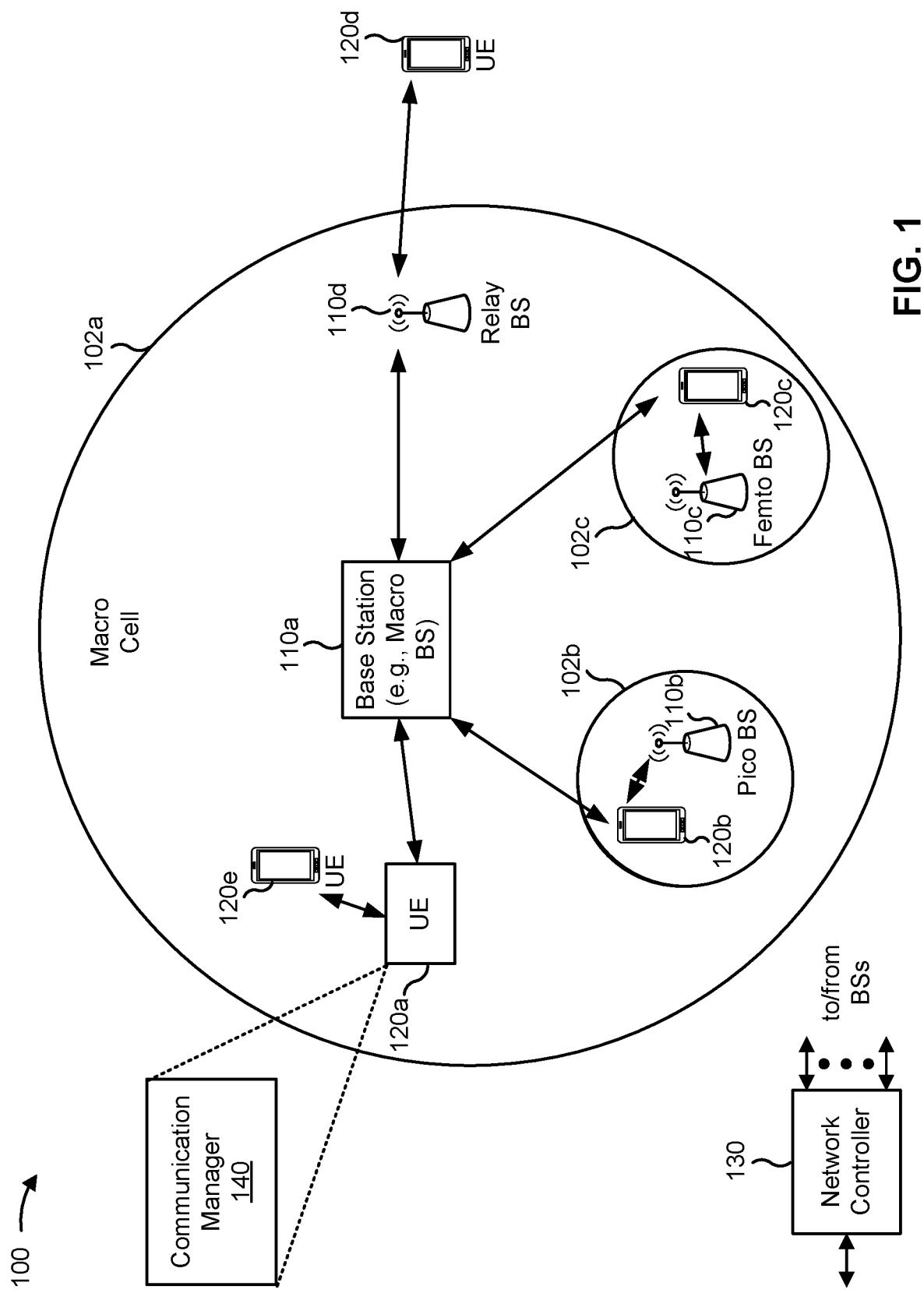
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, or the like.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a UE (e.g., UE 120) may include a communication manager 140. As described in more detail elsewhere herein, the communication manager 140 may receive a downlink transmission from a first TRP in a full-duplex multi-TRP configuration; and perform an uplink transmission to a second TRP in the full-duplex multi-TRP configuration based at least in part on a timing advance adjustment associated with the uplink transmission. Additionally, or alternatively, the communication manager 140 may perform one or more other operations described herein.

As indicated above, FIG. 1 is provided as an example. Other examples may differ from what is described with regard to FIG. 1.

Figure 2:
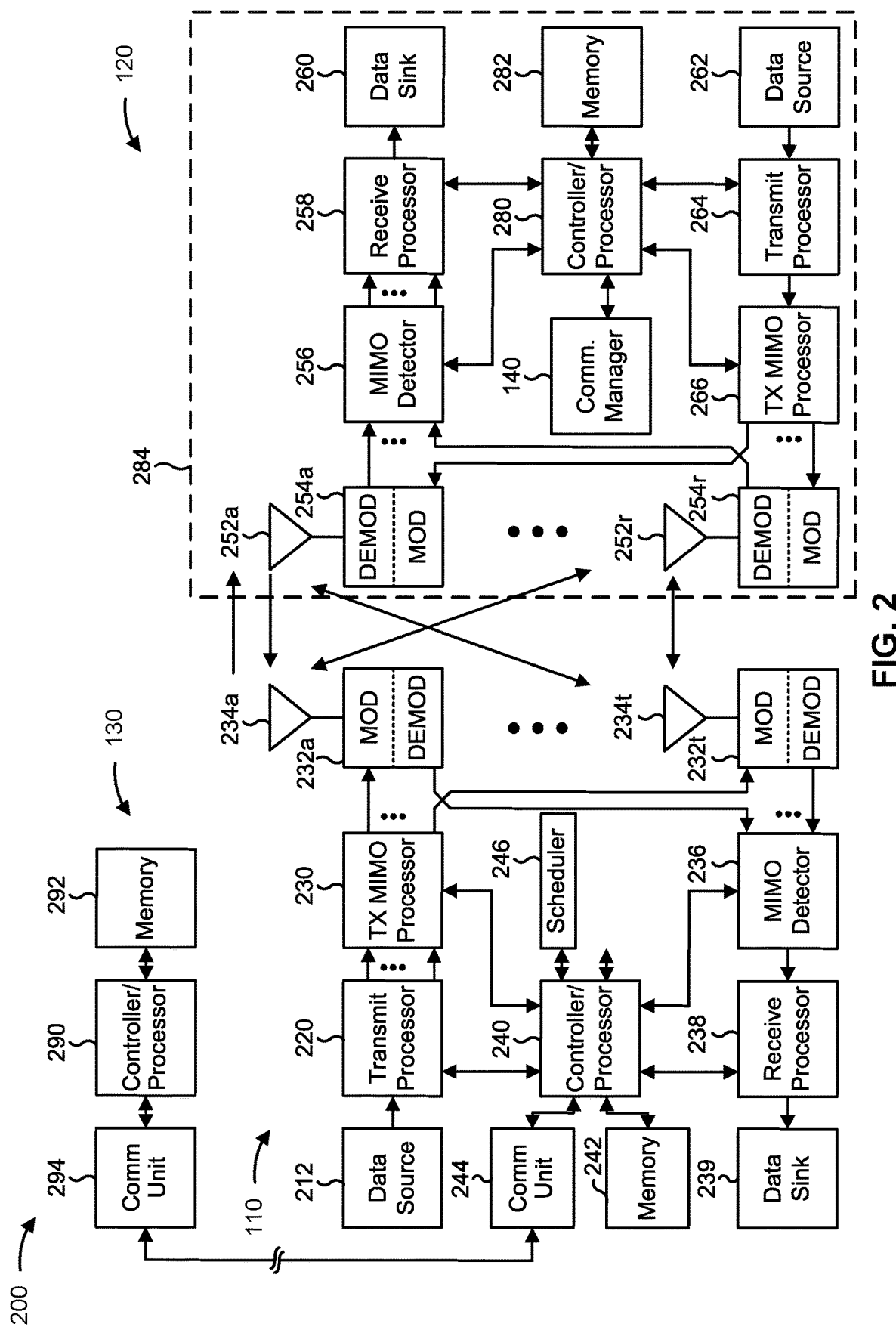
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS), a phase tracking reference signal (PTRS), and/or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein. A scheduler 246 may schedule UEs for data transmission on the downlink and/or uplink.

Controller/processor 240 of base station 110, controller/processor 280 of UE 120, and/or any other component(s) of FIG. 2 may perform one or more techniques associated with timing advance adjustments in a full-duplex multi-TRP configuration, as described in more detail elsewhere herein. For example, controller/processor 240 of base station 110, controller/processor 280 of UE 120, and/or any other component(s) of FIG. 2 may perform or direct operations of, for example, method 1900 of FIG. 19, and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 1900 of FIG. 19, and/or other processes as described herein. In some aspects, executing instructions may include running the instructions, converting the instructions, compiling the instructions, and/or interpreting the instructions, among other examples.

In some aspects, a UE (e.g., UE 120) includes means for receiving a downlink transmission from a first TRP in a full-duplex multi-TRP configuration; and/or means for performing an uplink transmission to a second TRP in the full-duplex multi-TRP configuration based at least in part on a timing advance adjustment associated with the uplink transmission. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
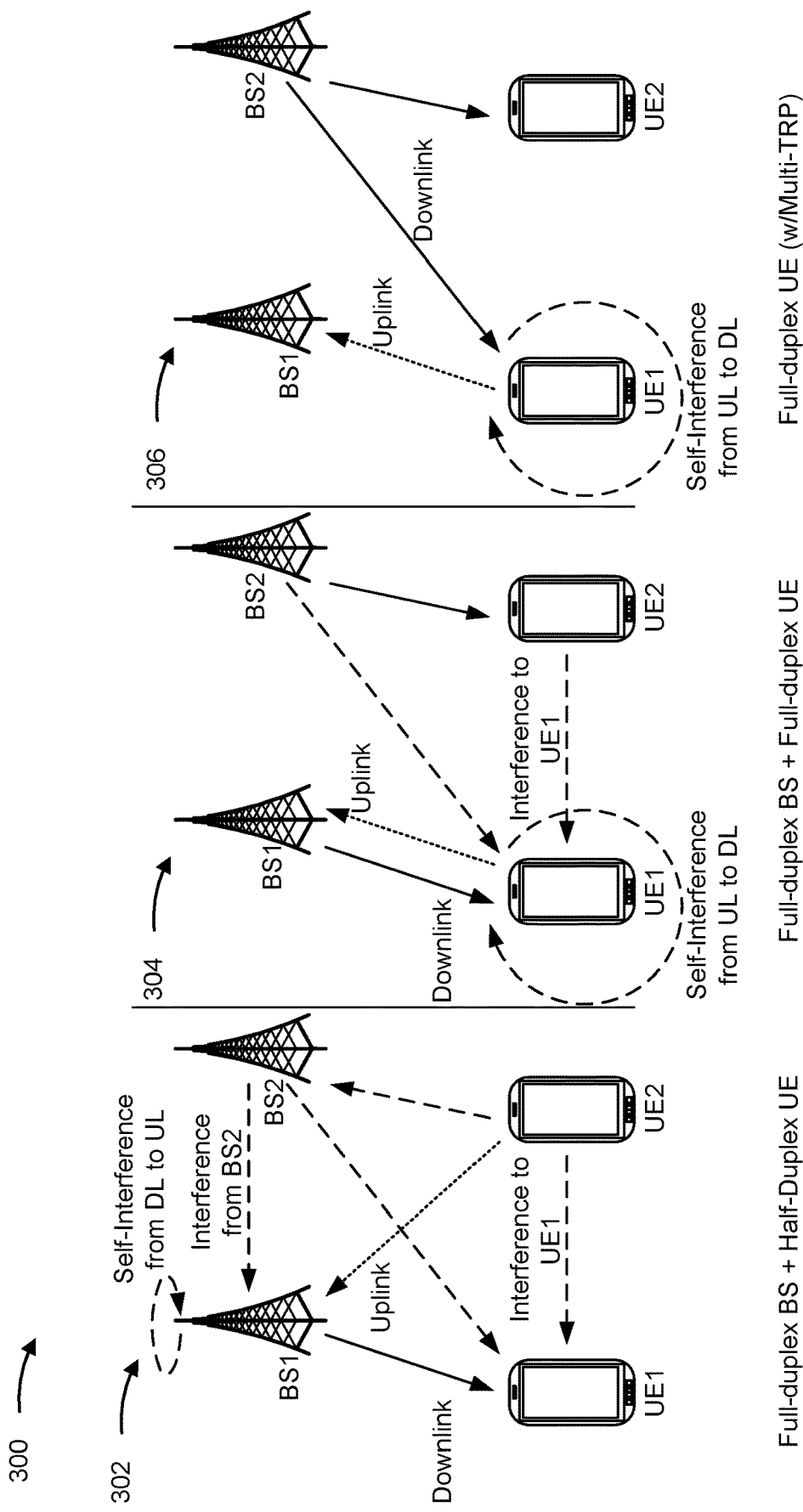
FIG. 3 is a diagram illustrating an example of full-duplex communication modes.

FIG. 3 is a diagram illustrating an example 300 of full-duplex communication modes. At 302, a first base station and a second base station may be full-duplex base stations. A first UE and a second UE may be half duplex UEs. The first base station may perform downlink transmissions to the first UE, and the first base station may receive uplink transmissions from the second UE. The first base station may experience self-interference from a downlink to an uplink based at least in part on the downlink transmissions to the first UE and the uplink transmissions received from the second UE. The first base station may experience interference from the second base station. The first UE may experience interference from the second base station and the second UE.

At 304, a first base station and a second base station may be full-duplex base stations. A first UE and a second UE may be full-duplex UEs. The first base station may perform downlink transmissions to the first UE, and the first base station may receive uplink transmissions from the first UE. The first UE may experience self-interference from an uplink to a downlink based at least in part on the downlink transmissions from the first base station and the uplink transmissions to the first base station. The first UE may experience interference from the second base station and the second UE.

At 306, a first UE and a second UE may be full-duplex UEs and may communicate in a multi-TRP configuration. A first base station may receive uplink transmissions from the first UE, and a second base station may perform downlink transmissions to the first UE and the second UE. The first UE may experience self-interference from an uplink to a downlink based at least in part on the uplink transmissions to the first base station and the downlink transmissions from the second base station.

As indicated above, FIG. 3 is provided as an example. Other examples may differ from what is described with regard to FIG. 3.

Figure 4:
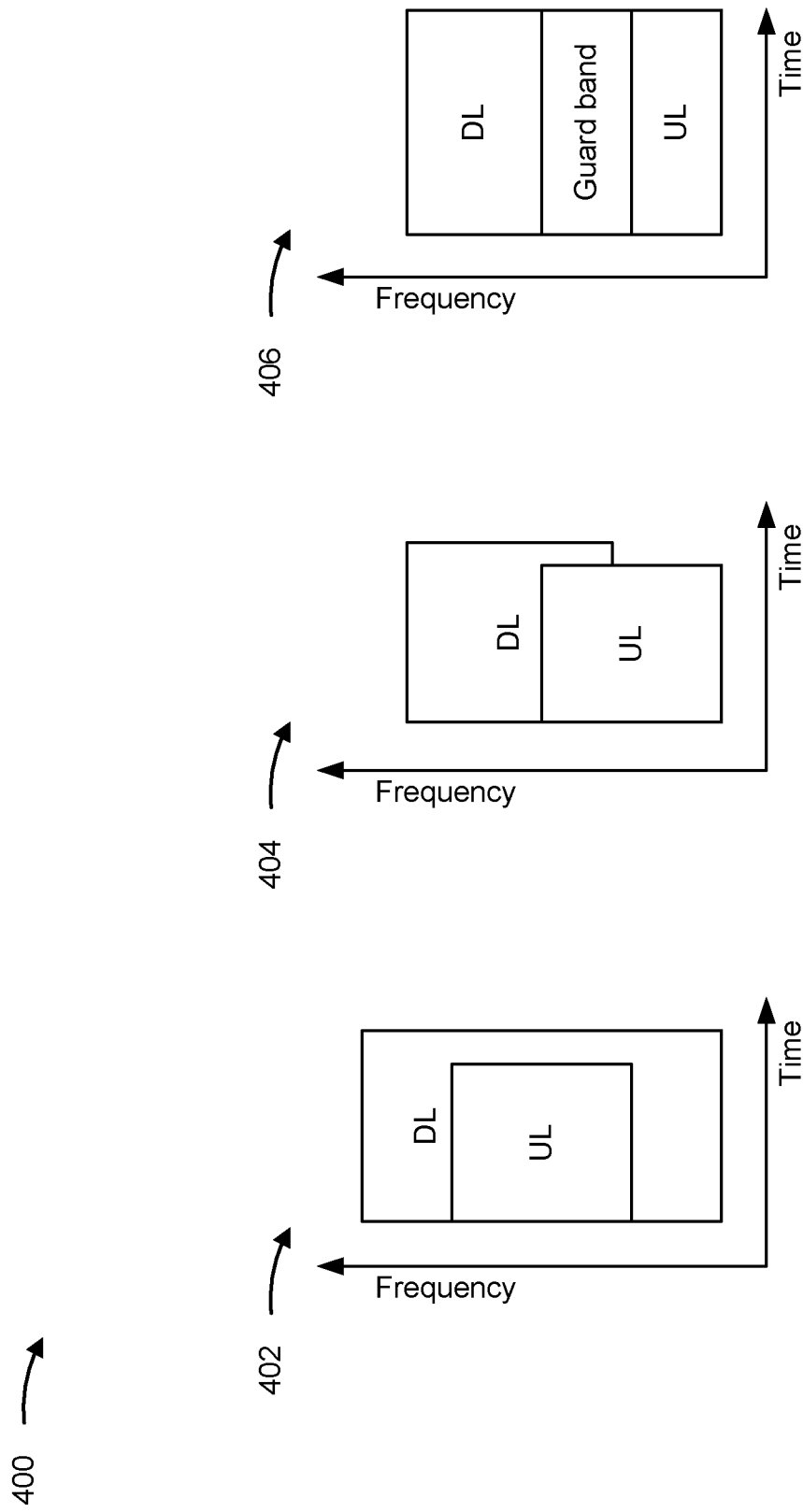
FIG. 4 is a diagram illustrating examples of full-duplex communication.

FIG. 4 is a diagram illustrating examples 400 of full-duplex communication. A UE may operate in an in-band full-duplex mode. In the in-band full-duplex mode, the UE may transmit and receive on a same time and frequency resource. An uplink and a downlink may share the same time and frequency resource. For example, at 402, a time and frequency resource for the uplink may fully overlap with a time and frequency resource for the downlink. As another example, at 404, a time and frequency resource for the uplink may partially overlap with a time and frequency resource for the downlink.

A UE may operate in a sub-band frequency division duplex mode (or a flexible duplex mode). In the sub-band frequency division duplex mode, the UE may transmit and receive at a same time, but the UE may transmit and receive on a different frequency resource. For example, at 406, a downlink resource may be separated from an uplink resource by a guard band in a frequency domain.

As indicated above, FIG. 4 is provided as an example. Other examples may differ from what is described with regard to FIG. 4.

Figure 5:
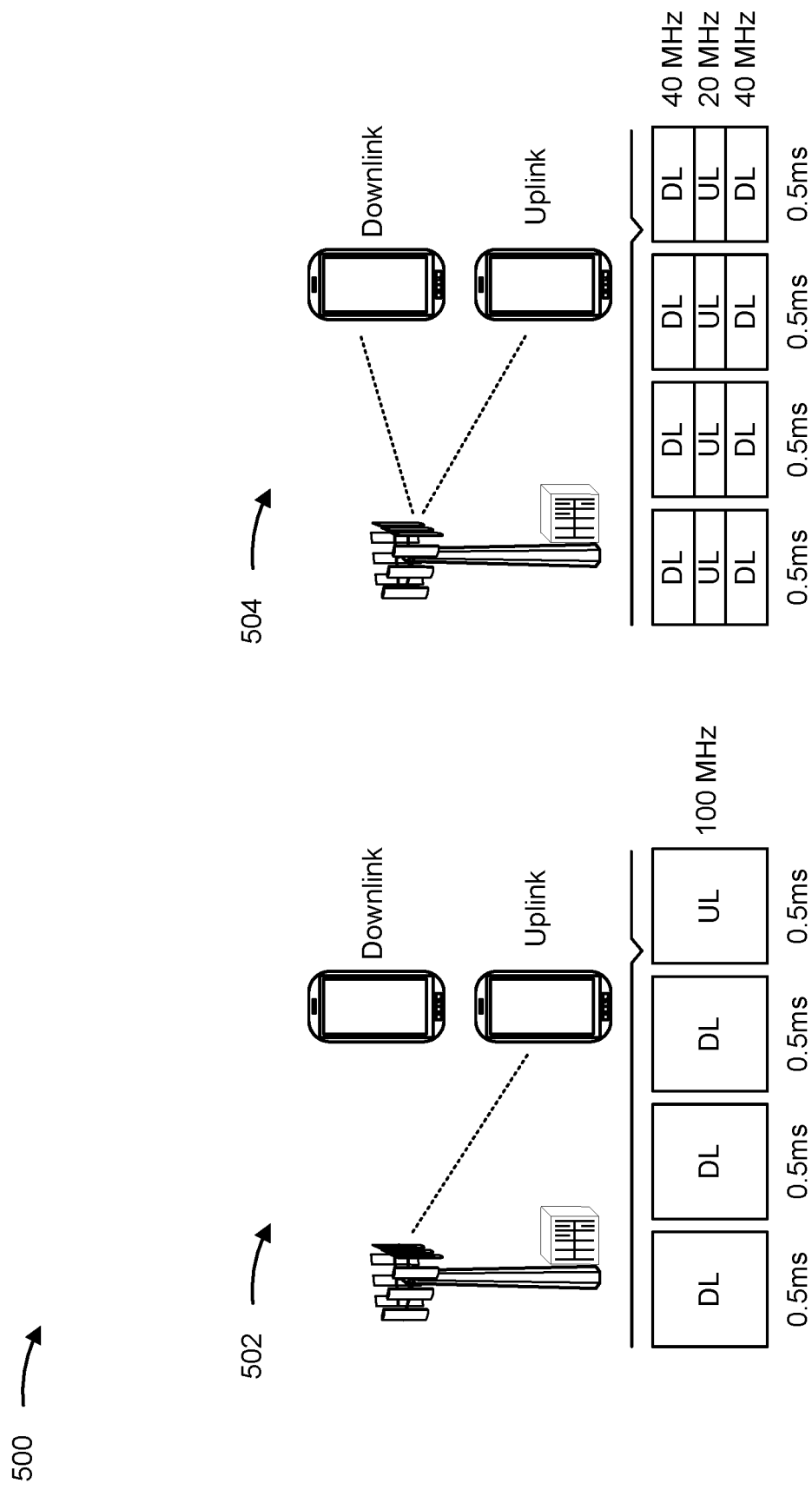
FIG. 5 is a diagram illustrating examples of communications in an uplink and in a downlink.

FIG. 5 is a diagram illustrating examples 500 of communications in an uplink and in a downlink. At 502, a base station may support a static time division duplexing (TDD) operation, in which downlink and uplink transmissions may be time division multiplexed. Downlink transmissions and uplink transmissions may be associated with a single panel. A downlink transmission may span 0.5 ms and an uplink transmission may span 0.5 ms. A bandwidth associated with the downlink and uplink transmissions may be 100 MHz. At 504, a base station may support sub-band duplex operation, in which downlink and uplink transmissions may be simultaneous. Downlink transmissions may be associated with a first panel and uplink transmissions may be associated with a second panel. Alternatively, downlink and uplink transmissions may be associated with distributed TRPs instead of co-located panels. Within a 0.5 ms duration, a first downlink transmission may be associated with a bandwidth of 40 MHz, an uplink transmission may be associated with a bandwidth of 20 MHz, and a second downlink transmission may be associated with a bandwidth of 40 MHz.

As indicated above, FIG. 5 is provided as an example. Other examples may differ from what is described with regard to FIG. 5.

Figure 6:
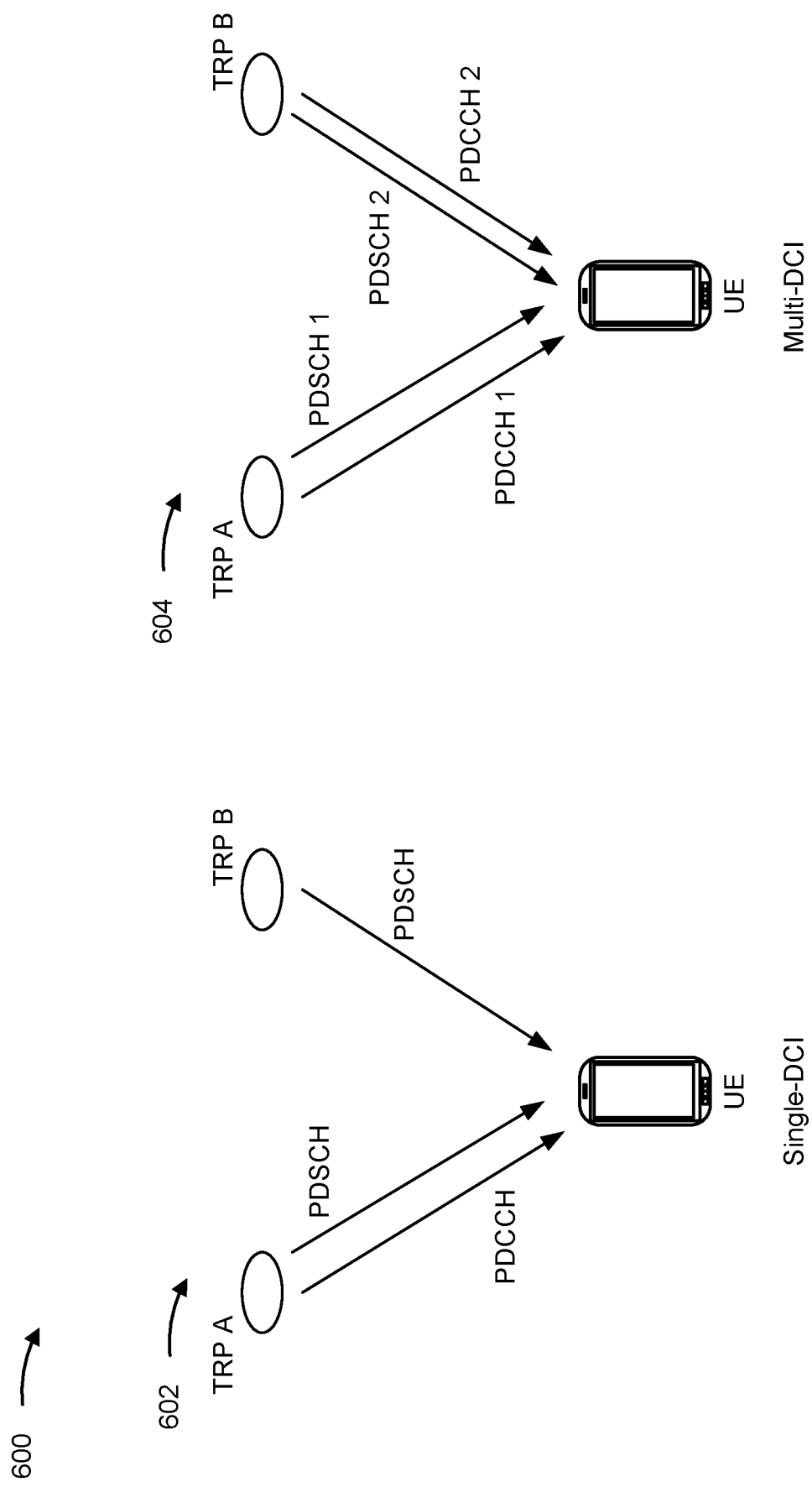
FIG. 6 is a diagram illustrating examples of multi-TRP operations.

FIG. 6 is a diagram illustrating examples 600 of multi-TRP operations. A multi-TRP operation may be defined in a given serving cell from a UE perspective. A multi-TRP configuration may be associated with a same physical cell identifier (PCI). The multi-TRP operation may be a single downlink control information (DCI) based multi-TRP operation or a multi-DCI based TRP operation.

At 602, in the single-DCI based TRP operation, a UE may receive a PDCCH and a first physical downlink shared channel (PDSCH) from a first TRP (TRP A). The UE may receive a second PDSCH from a second TRP (TRP B). The single-DCI based TRP operation may be applicable to an ideal backhaul. Different PDSCH schemes may be used for robustness, such as spatial division multiplexing (SDM), frequency division multiplexing (FDM), or time division multiplexing (TDM).

At 604, in the single-DCI based TRP operation, a UE may receive a first PDCCH and a first PDSCH from a first TRP. The UE may receive a second PDCCH and a second PDSCH from a second TRP. The single-DCI based TRP operation may be applicable to an ideal backhaul or a non-ideal backhaul. Further, a carrier aggregation framework may be leveraged to treat different TRPs as different virtual component carriers from a UE capability perspective. A first DCI transmitted from the first TRP may schedule the first PDSCH transmitted from the first TRP, and a second DCI transmitted from the second TRP may schedule the second PDSCH transmitted from the second TRP.

As indicated above, FIG. 6 is provided as an example. Other examples may differ from what is described with regard to FIG. 6.

Figure 7:
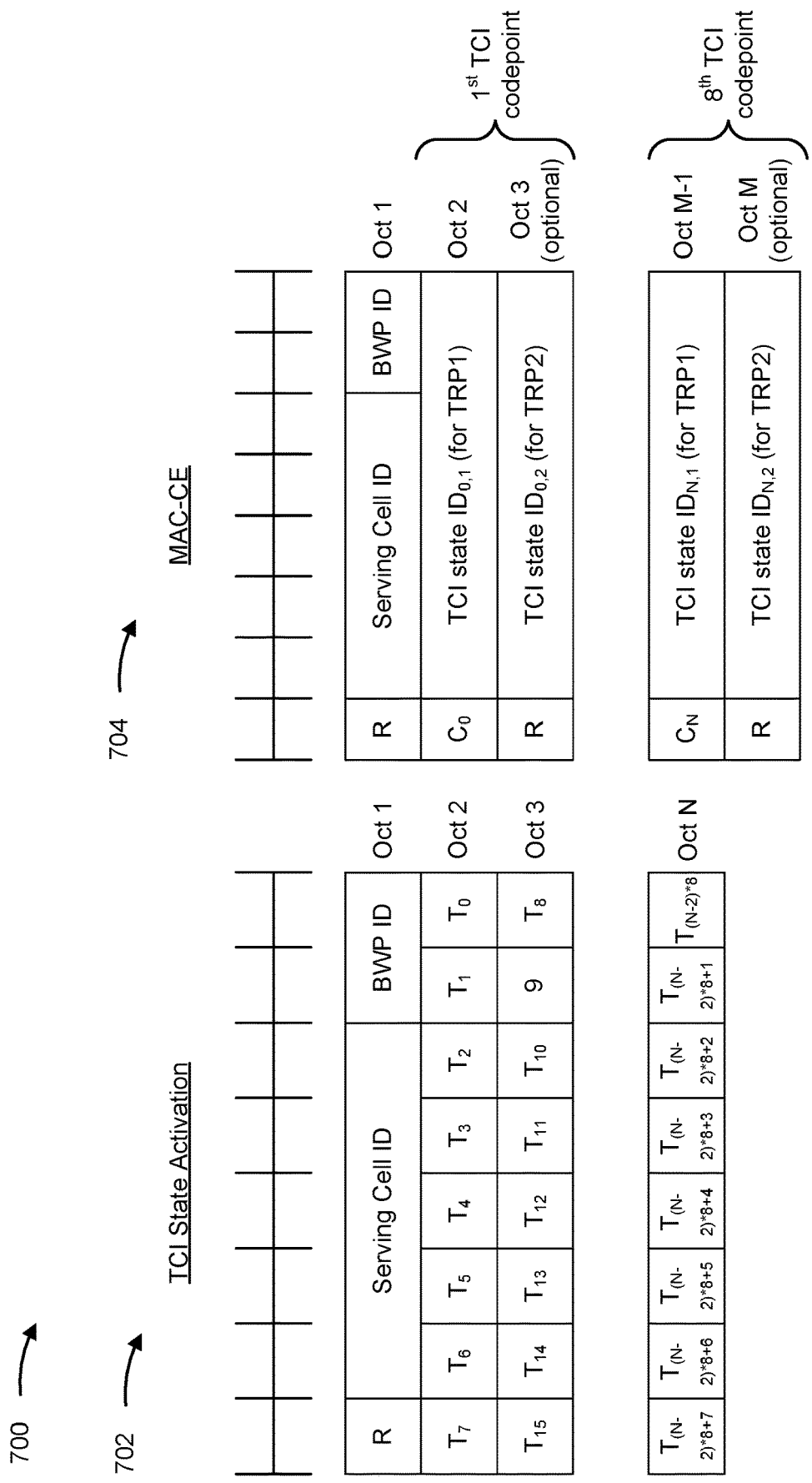
FIG. 7 is a diagram illustrating examples of transmission configuration indication (TCI) states.

FIG. 7 is a diagram illustrating examples 700 of TCI states. At 702, for a DCI-based TCI state activation, a TCI field in DCI may indicate one or two TCI states. A quantity of bits for the TCI field in the DCI may be a maximum of three bits. At 704, for a medium access control element (MAC-CE) based TCI state activation, a MAC-CE may activate TCI states and map one or two active TCI states to a TCI codepoint. For example, a first TCI state associated with a first TRP and a second TCI state associated with a second TRP may be mapped to a first TCI codepoint, and so on. The DCI-based TCI state activation or the MAC-CE based TCI state activation may be used for SDM, FDM, and TDM schemes.

As indicated above, FIG. 7 is provided as an example. Other examples may differ from what is described with regard to FIG. 7.

A UE may differentiate between different TRPs based at least in part on a CORESET pool index value. A CORESET may be configured with a CORESET pool index value. "CORESET" may refer to a set of physical resources within a specific area in a downlink resource grid. The CORESET may be used to carry a PDCCH (e.g., DCI). "CORESET" may refer to a set of resource blocks and a set of OFDM symbols, which may be configurable with a corresponding PDCCH search space. A CORESET may provide configuration flexibilities of control regions including time, frequency, numerologies, and operating points to address a wide range of use cases. The CORESET pool index value may be 0 or 1, which may group the CORESETs into two separate groups. Other than separate CORESET pool index values, which may be associated with different TRPs, a notion of different TRPs may be transparent to the UE.

Figure 8:
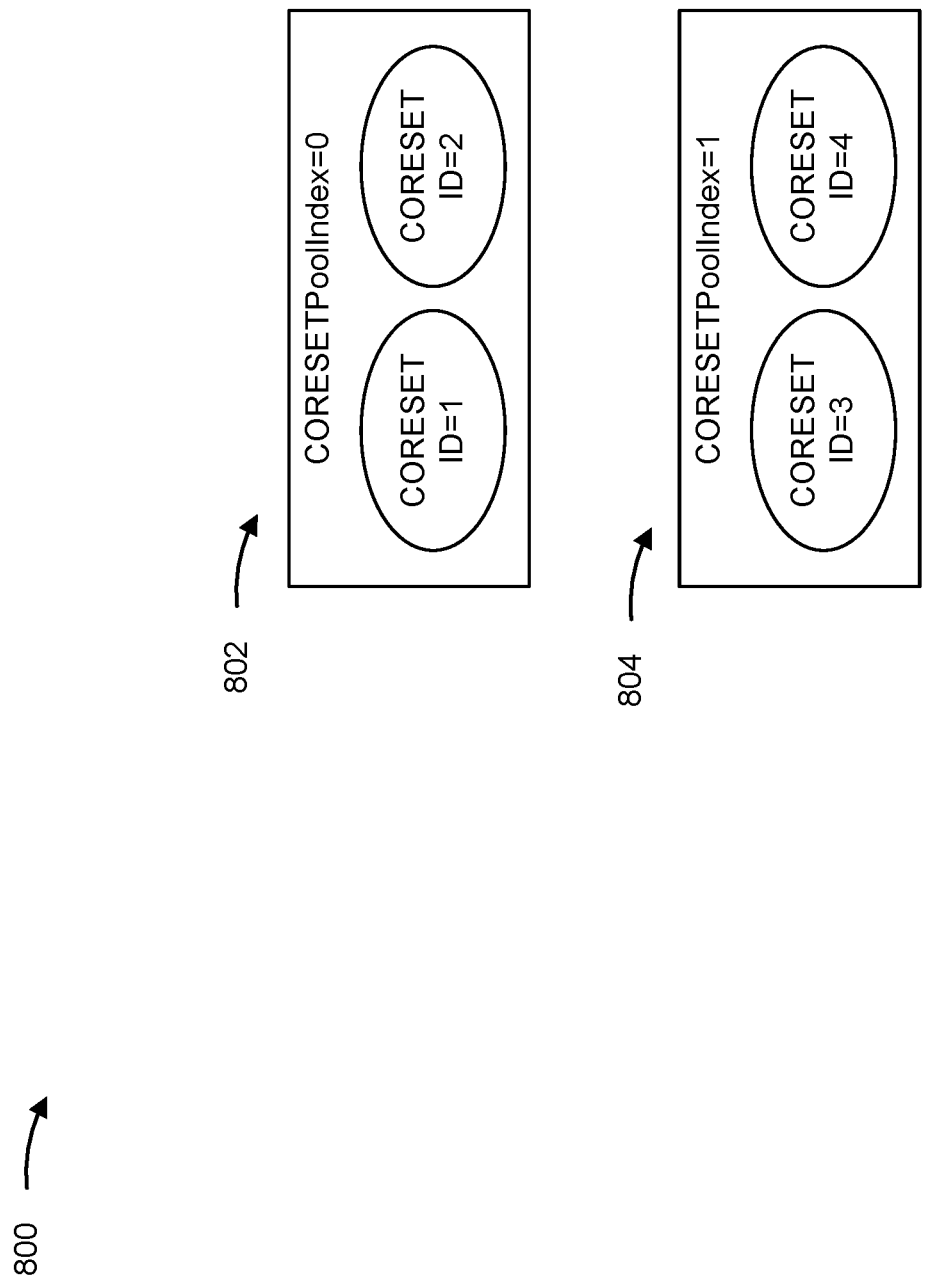
FIG. 8 is a diagram illustrating examples of control resource set (CORESET) pool index value configurations.

FIG. 8 is a diagram illustrating examples 800 of CORESET pool index value configurations. A UE may be configured by a higher parameter PDCCH-Config, which may include two different CORESET pool index values in CORESETs for an active bandwidth part of a serving cell. At 802, the UE may be configured with a first CORESET pool index value (CORESETPoolIndex=0). The first CORESET pool index value may be associated with two separate CORESET IDs (e.g., CORESET ID=1 and CORESET ID=2). At 804, the UE may be configured with a second CORESET pool index value (CORESETPoolIndex=1). The second CORESET pool index value may be associated with two separate CORESET IDs (e.g., CORESET ID=3 and CORESET ID=4). The first CORESET pool index value may be associated with a first TRP and the second CORESET pool index value may be associated with a second TRP. Further, a CORESET pool index of a CORESET in which a DCI is received may be used for different purposes, such as hybrid automatic repeat request acknowledgement (HARQ-ACK) code construction and transmission, PDSCH scrambling, and/or rate matching.

As indicated above, FIG. 8 is provided as an example. Other examples may differ from what is described with regard to FIG. 8.

Figure 9:
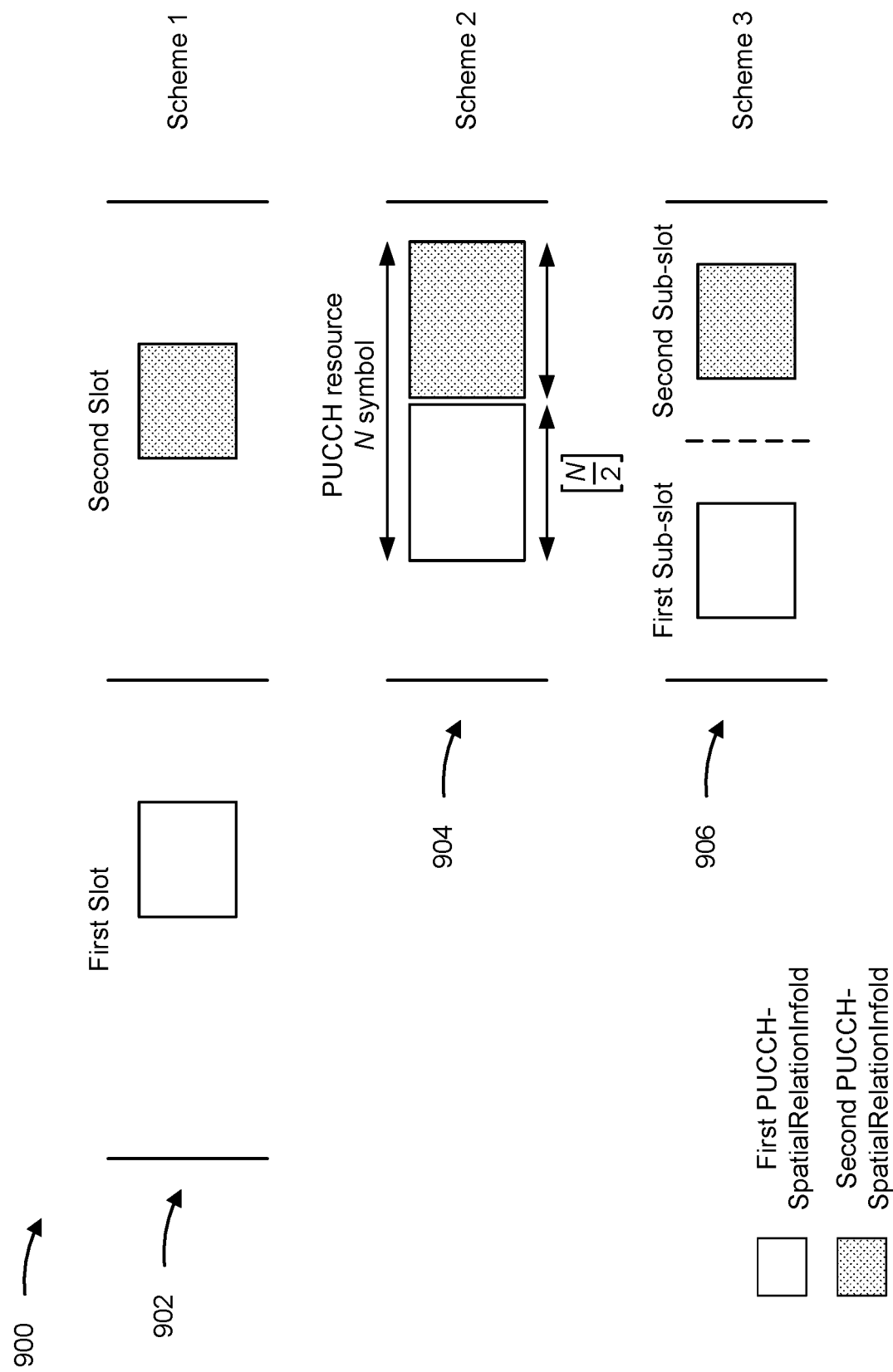
FIG. 9 is a diagram illustrating examples of time division multiplexed multi-beam physical uplink control channel (PUCCH) transmissions.

FIG. 9 is a diagram 900 illustrating examples of time division multiplexed multi-beam PUCCH transmissions. At 902, in a multi-TRP configuration, an inter-slot PUCCH repetition may be associated with different beams. A first PUCCH repetition may be associated with a first slot and a first PUCCH spatial relation information identifier (PUCCH-SpatialRelationInfoId), and a second PUCCH repetition may be associated with a second slot and a second PUCCH spatial relation information identifier. One PUCCH resource may be activated with two spatial relation information identifiers. Two sets of power control parameters may apply for two sets of PUCCH repetitions.

At 904, an intra-PUCCH resource beam hopping may be used in an intra-slot case. Within a single slot (e.g., the second slot), a PUCCH resource spanning N symbols may be associated with a first PUCCH repetition and a second PUCCH repetition, where each of the first PUCCH repetition and the second PUCCH repetition may be associated with N/2 symbols. The first PUCCH repetition may be associated with a first PUCCH spatial relation information identifier, and the second PUCCH repetition may be associated with a second PUCCH spatial relation information identifier.

At 906, a sub-slot based PUCCH repetition with different beams may be used in the intra-slot case. Within a single slot (e.g., the second slot), a first PUCCH repetition may be associated with a first sub-slot and a second PUCCH repetition may be associated with a second sub-slot. The first PUCCH repetition may be associated with a first PUCCH spatial relation information identifier, and the second PUCCH repetition may be associated with a second PUCCH spatial relation information identifier. Sub-slot based PUCCH repetitions, which may be associated with a sub-slot configuration and a quantity of PUCCH repetitions, may be used for industrial IoT (IIoT) in a single-TRP or a multi-TRP configuration.

As indicated above, FIG. 9 is provided as an example. Other examples may differ from what is described with regard to FIG. 9.

A single-DCI based PUSCH repetition may be associated with different beams. A PUSCH repetition may be a Type-A repetition or a Type-B repetition. The PUSCH repetition may be codebook-based, and may be associated with two transmitted precoding matrix indicators (TPMIs) and two sounding reference signal (SRS) resource sets. The PUSCH repetition may be non-codebook based and may be associated with two SRS resource sets. An aperiodic channel state information (CSI) may be multiplexed on the PUSCH repetition.

Figure 10:
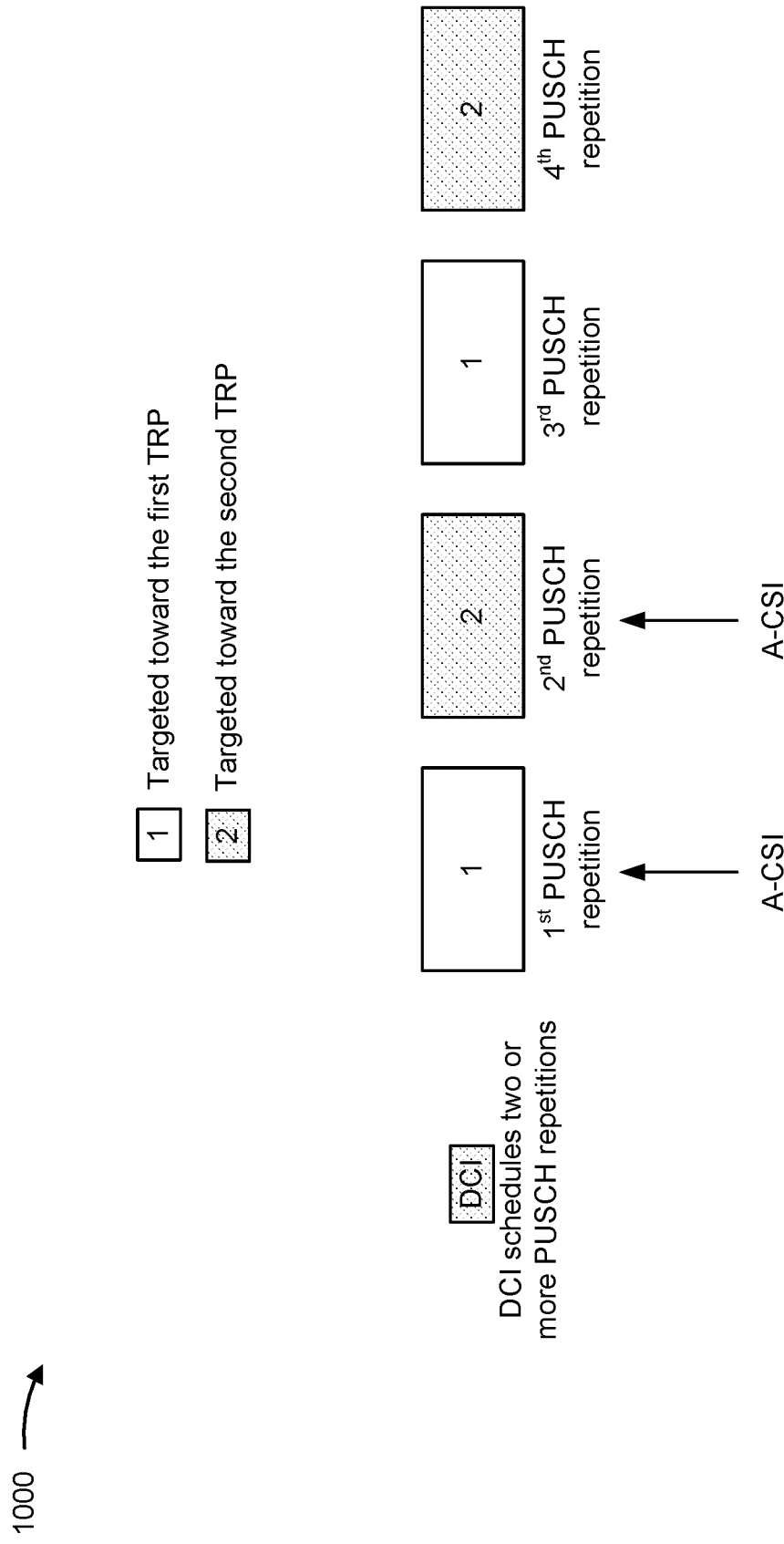
FIG. 10 is a diagram illustrating examples of time division multiplexed multi-beam PUSCH transmissions.

FIG. 10 is a diagram illustrating examples 1000 of time division multiplexed multi-beam PUSCH transmissions. In a multi-TRP configuration, a DCI may schedule two or more PUSCH repetitions. A first PUSCH repetition may be associated with a first TRP. An aperiodic CSI may be multiplexed with the first PUSCH repetition. A second PUSCH repetition may be associated with a second TRP. An aperiodic CSI may be multiplexed with the second PUSCH repetition. A third PUSCH repetition may be associated with the first TRP. A fourth PUSCH repetition may be associated with the second TRP. The first PUSCH repetition and the third PUSCH repetition may be targeted toward the first TRP, and the second PUSCH repetition and the fourth PUSCH repetition may be targeted toward the second TRP.

As indicated above, FIG. 10 is provided as an example. Other examples may differ from what is described with regard to FIG. 10.

Figure 11:
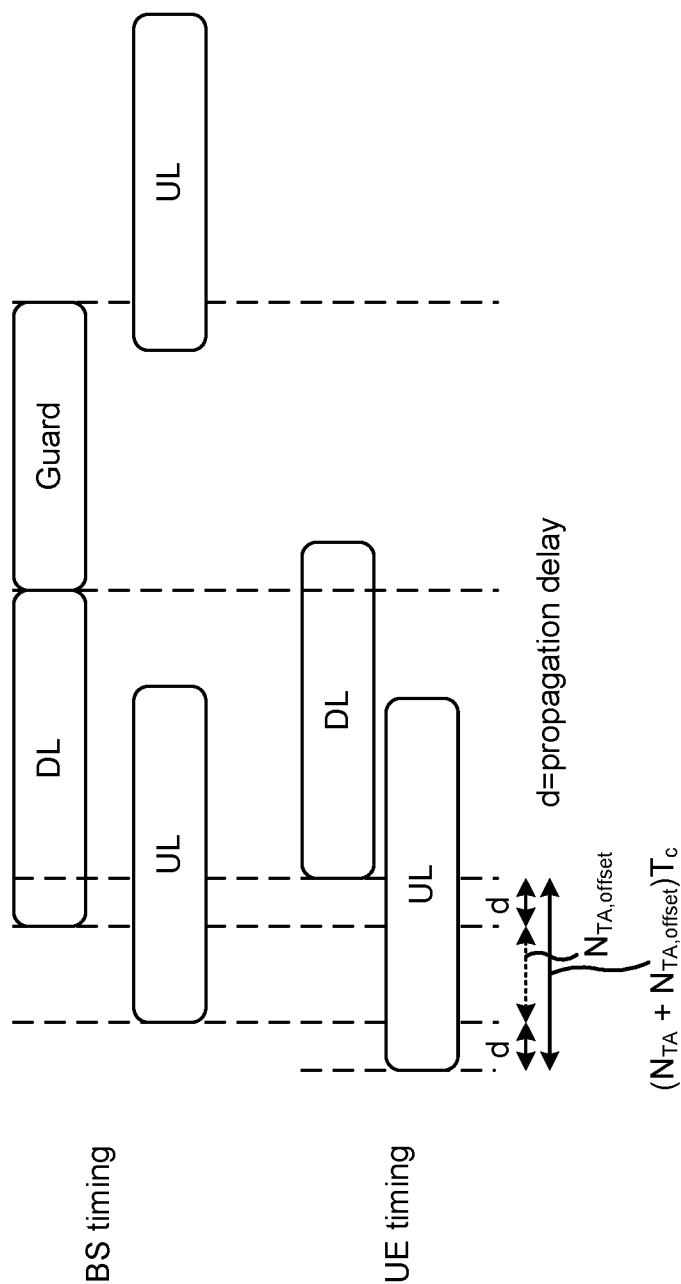
FIG. 11 is a diagram illustrating an example of an uplink-downlink timing.

FIG. 11 is a diagram illustrating an example of an uplink-downlink timing. An uplink frame for transmission from a UE may start $T_{TA}=(N_{TA}+N_{TA,offset})T_c$ before a start of a corresponding downlink frame at the UE, where $T_{TA}$ is a timing advance between downlink and uplink, $N_{TA}$ is a timing advance between downlink and uplink, $N_{TA,offset}$ is a fixed offset used to calculate a timing advance, and $T_c$ is a basic time unit for NR. Further, $N_{TA}$ may be received from a MAC-CE or a random access response (RAR), and $N_{TA,offset}$ may be associated with a frequency range and a band of a cell used for an uplink transmission. For example, for an FR1 frequency division duplex (FDD) band without an LTE-NR coexistence case or an FR1 TDD band without the LTE-NR coexistence case, $N_{TA,offset}$ may be 25600. For an FR1 FDD band with the LTE-NR coexistence case, $N_{TA,offset}$ may be 0. For an FR1 TDD band with the LTE-NR coexistence case, $N_{TA,offset}$ may be 39936. For FR2, $N_{TA,offset}$ may be 13792. Downlink and uplink transmissions may be associated with a propagation delay with respect to a base station timing and a UE timing. Further, a guard band may be used to switch from the downlink to the uplink based at least in part on a timing advance.

As indicated above, FIG. 11 is provided as an example. Other examples may differ from what is described with regard to FIG. 11.

For a timing advance command received on uplink slot n, a corresponding adjustment of an uplink transmission timing may apply from a beginning of uplink slot n+k+1, where $k=[N_{slot}^{subframe,\mu} \cdot (N_{T,1}+N_{T,2}+N_{TA,max}+0.5)/T_{sf}]$, $N_{T,1}$ is a time duration in ms of $N_1$ symbols corresponding to a PDSCH processing time for a UE processing capability when an additional PDSCH DMRS is configured, $N_{T,2}$ is a time duration in ms of $N_2$ symbols corresponding to a PUSCH preparation time for the UE processing capability, $N_{TA,max}$ is a maximum timing advance value in ms which may be provided by a timing advance command field of 12 bits, $N_{slot}^{subframe,\mu}$ is a quantity of slots per subframe, and $T_{sf}$ is a subframe duration of 1 ms.

A UE may use k slots to apply a timing advance adjustment, where k may be based at least in part on the PDSCH processing time of $N_1$ and the PUSCH preparation time of $N_2$. In other words, $N_1$ and $N_2$ may correspond to a processing time. Further, k may depend on a maximum timing advance. The k slots needed to apply the timing advance adjustment may not be suitable for dynamic TRP switching.

Figure 12:
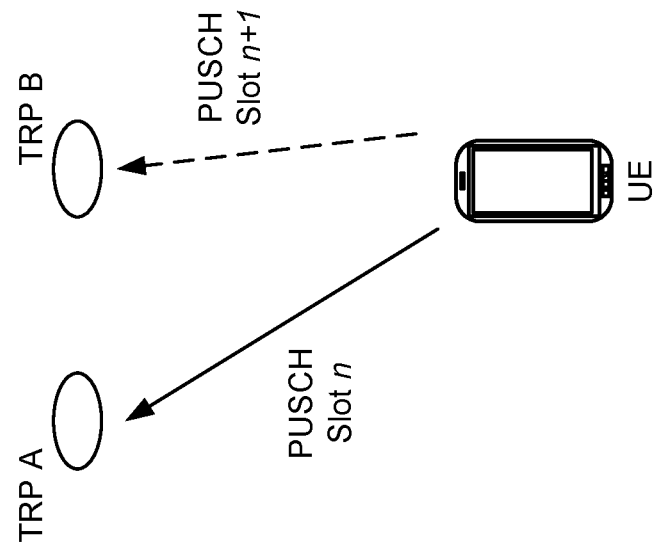
FIG. 12 is a diagram illustrating an example of PUSCH transmissions.

FIG. 12 is a diagram illustrating an example of PUSCH transmissions. A UE may transmit a first PUSCH in slot n to a first TRP (TRP A). The UE may transmit a second PUSCH in slot n+1 to a second TRP (TRP B). The UE may perform a dynamic TRP switching between the first TRP and the second TRP. When a timing advance command is received in slot n, a corresponding adjustment of an uplink transmission timing may be applied from a beginning of uplink slot n+1+k, which may not be suitable when the UE performs the dynamic TRP switching between the first TRP and the second TRP. In other words, the UE may be unable to apply the corresponding adjustment of the uplink transmission timing when transmitting the second PUSCH in slot n+1 to the second TRP. Thus, a timing advance enhancement may be needed for a multi-TRP configuration.

As indicated above, FIG. 12 is provided as an example. Other examples may differ from what is described with regard to FIG. 12.

FIG. 13 is a diagram illustrating an example 1300 of a slot having a guard symbol for switching from a downlink to an uplink. The slot may include 14 symbols (e.g., symbol 0 to symbol 13). Symbol 0 may be associated with a PDCCH. Symbol 1 may be a flexible symbol, which may be used as the guard symbol. In a TDD downlink-uplink switching, the flexible symbol may be used as the guard symbol, which may be used for switching from a downlink to an uplink. Symbols 2 to 12 may be associated with a PUSCH. Symbol 13 may be associated with an SRS. The guard symbol associated with symbol 1 may enable switching between the PDCCH and the PUSCH. The guard symbol may be needed to accommodate for a round-trip propagation delay, a transceiver switching at a base station, and a transceiver switching at a UE.

As indicated above, FIG. 13 is provided as an example. Other examples may differ from what is described with regard to FIG. 13.

In a full-duplex operation, a downlink-uplink misalignment at a UE (e.g., a full-duplex UE) may be less than a cyclic prefix (CP) to reduce self-interference at UE. The UE may use different timing advance values for different TRPs. In a full-duplex multi-TRP operation, a relatively small timing advance adjustment may help reduce self-interference at the UE. The relatively small timing advance adjustment (or a misalignment compensation) may also improve an error vector magnitude (EVM) for channels and signals associated with a measurement interval.

Figure 14:
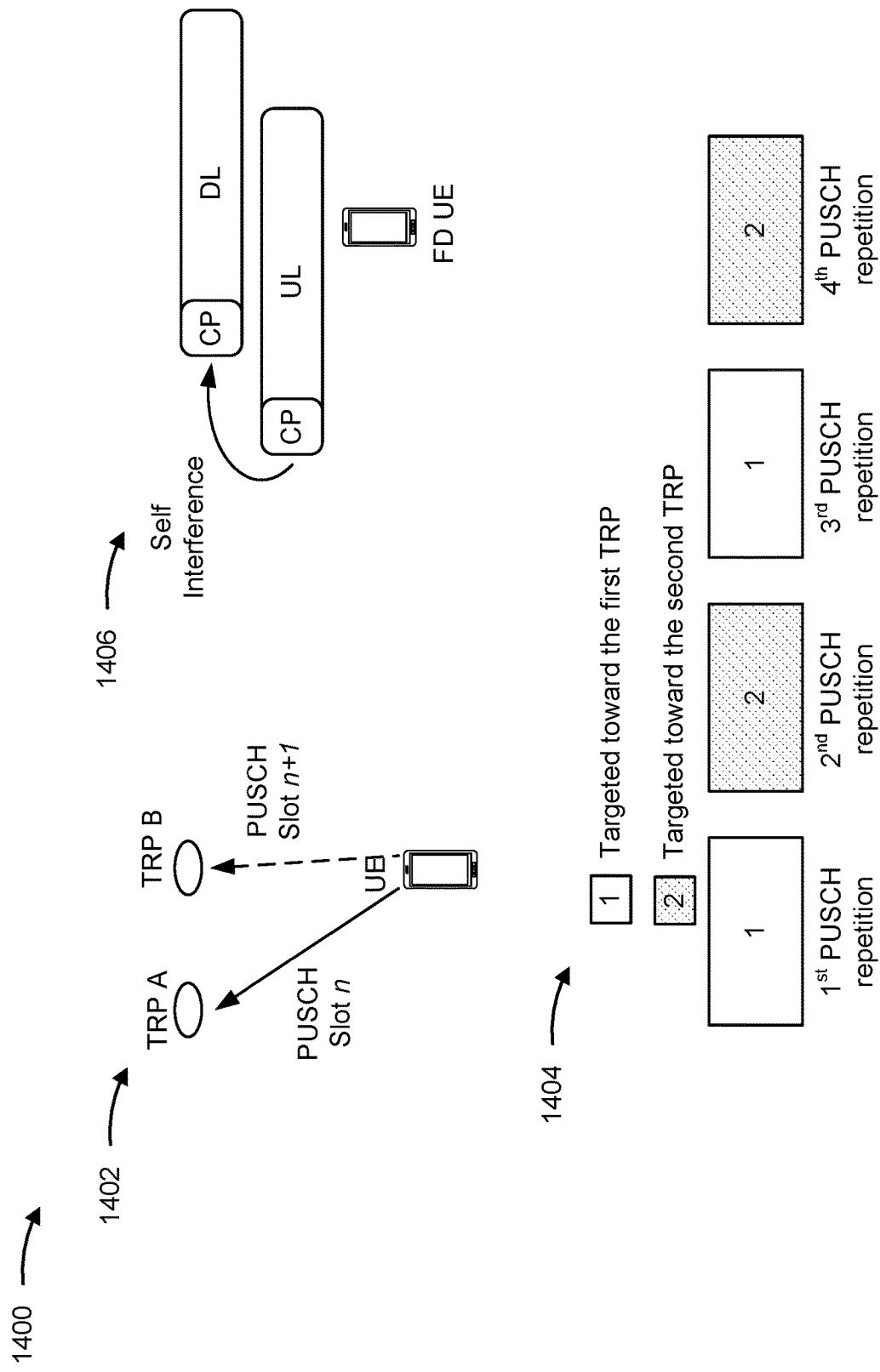
FIG. 14 is a diagram illustrating an example of a timing advance in a multi-TRP configuration.

FIG. 14 is a diagram illustrating an example 1400 of a timing advance in a multi-TRP configuration. At 1402, a multi-TRP configuration may include a first TRP (TRP A) and a second TRP (TRP B). A UE (e.g., a full-duplex UE) may transmit a first PUSCH in slot n to the first TRP and a second PUSCH in slot n+1 to the second TRP. A UE may need k slots to apply a timing advance adjustment, which may not be suitable for dynamic TRP switching between the first TRP and the second TRP for an uplink reception of the second PUSCH at the second TRP. At 1404, a UE may transmit a first PUSCH repetition to the first TRP, a second PUSCH repetition to the second TRP, a third PUSCH repetition to the first TRP, and a fourth PUSCH repetition to the second TRP. When dynamically switching between the first TRP and the second TRP for transmitting PUSCH repetitions, k slots may not be available to apply the timing advance adjustment. At 1406, for a UE (e.g., a full-duplex UE), a downlink transmission may be associated with a cyclic prefix, and an uplink transmission may be associated with a cyclic prefix. A downlink-uplink misalignment at the UE may be less than the cyclic prefix associated with the downlink transmission and the uplink transmission to reduce self-interference at the UE.

As indicated above, FIG. 14 is provided as an example. Other examples may differ from what is described with regard to FIG. 14.

In some cases, a UE may perform a one-shot timing adjustment. For example, T1 may represent a reception time at the UE before (e.g., just before) the one-shot timing adjustment, and T2 may represent a reception time to be used at the UE after (e.g., just after) the one-shot timing adjustment. When |T1−T2|>H, the UE may adjust a transmission timing in one adjustment in accordance with the one-shot timing adjustment, where H is a configured threshold. A UE transmit timing after (e.g., immediately after) applying the one-shot timing adjustment may be given by T2−($N_{TA}$+$N_{TA,offset}$)+2(T1−T2), where $N_{TA}$ is a timing advance between downlink and uplink and $N_{TA,offset}$ is a fixed offset used to calculate the timing advance.

In a multi-TRP configuration, a UE may need k slots to apply a timing advance adjustment, which may not be suitable for dynamic TRP switching for an uplink reception (e.g., a dynamic TRP switching from a first TRP to a second TRP to enable an uplink reception of a PUSCH at the second TRP). Dynamic TRP switching may be utilized due to multi-TRP inter-slot/intra-slot PUCCH repetitions and inter-slot PUSCH repetitions, and in these cases, the k slots needed to apply a timing advance adjustment may not be suitable. Further, the multi-TRP configuration may aim to increase UE reliability and improve a downlink reception. However, a switch from a downlink slot/symbol to an uplink slot/symbol may involve a guard band, which may cause some delay and reduce a resource utilization.

In various aspects of techniques and apparatuses described herein, a UE (e.g., a full-duplex UE) may receive a PDCCH from a first TRP in a full-duplex multi-TRP configuration. The UE may perform a PUSCH transmission to a second TRP in the full-duplex multi-TRP configuration based at least in part on a timing advance adjustment associated with the uplink transmission. In some aspects, the UE may apply the timing advance adjustment based at least in part on an indication received from a base station. For example, the UE may receive, from the base station, an indication to set a timing advance offset to a value that satisfies a threshold value based at least in part on the downlink transmission and the uplink transmission being associated with two different TRPs. The UE may set the timing advance offset during the timing advance adjustment. The downlink transmission and the uplink transmission may not be separated by a guard symbol based at least in part on the downlink transmission and the uplink transmission being associated with the two different TRPs, which may improve a resource utilization. Further, the UE may perform the timing advance adjustment, such that a downlink-uplink misalignment between the downlink transmission and the uplink transmission may be less than a cyclic prefix length, which may reduce a level of self-interference at the UE. The cyclic prefix length may be the same for both the downlink transmission and the uplink transmission in a TDD mode.

Figure 15:
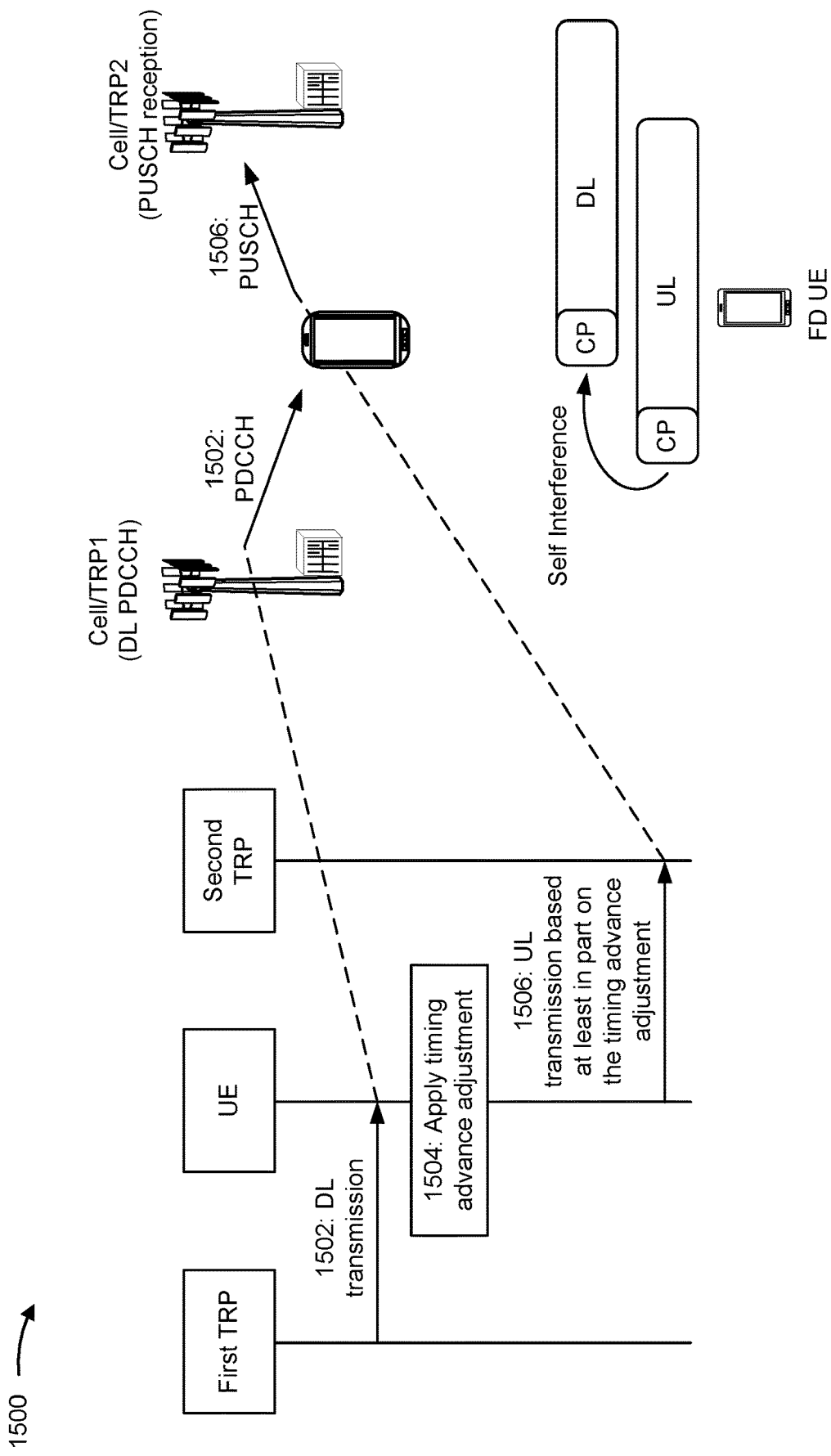
FIG. 15 is a diagram illustrating an example associated with timing advance adjustments in a full-duplex multi-TRP configuration.

FIG. 15 is a diagram illustrating an example 1500 associated with timing advance adjustments in a full-duplex multi-TRP configuration. As shown in FIG. 15, example 1500 includes communication between a UE (e.g., UE 120), a first TRP (e.g., base station (e.g., base station 110a), and a second TRP (e.g., base station 110b). In some aspects, the UE, the first TRP, and the second TRP may be included in a wireless network, such as wireless network 100.

At 1502, the UE (e.g., a full-duplex UE) may receive a downlink transmission from the first TRP. The first TRP may be associated with a first cell or a first base station. The first TRP may be included in a full-duplex multi-TRP configuration. The downlink transmission may be a PDCCH transmission. The UE may receive the downlink transmission from the first TRP in slot n.

At 1504, the UE may apply a timing advance adjustment based at least in part on an indication received from a base station associated with the first TRP or the second TRP. The indication may be to set a timing advance offset to a value that satisfies a threshold value. The indication may dynamically set the timing advance offset, which may be used for the timing advance adjustment. In other words, the timing advance offset may be set based at least in part on the timing advance adjustment. The UE may receive the indication based at least in part on the downlink transmission and the uplink transmission being associated with two different TRPs. In some aspects, the downlink transmission and the uplink transmission may not be separated by a guard symbol based at least in part on the downlink transmission and the uplink transmission being associated with the two different TRPs. In some aspects, a downlink-uplink misalignment between the downlink transmission and the uplink transmission may be less than a cyclic prefix associated with each of the downlink transmission and the uplink transmission, which may reduce self-interference at the UE In some aspects, the timing advance adjustment (e.g., a relatively small timing advance adjustment) may help reduce the self-interference at the UE. The timing advance adjustment may cause the downlink-uplink misalignment at the full-duplex to be less than the cyclic prefix.

In some aspects, the full-duplex multi-TRP configuration is associated with a single-DCI framework. In some aspects, the UE may receive, from the base station associated with the first TRP or the second TRP, an indication of a single timing advance for the full-duplex multi-TRP configuration. The single timing advance may be associated with the first TRP and the second TRP. In some aspects, the UE may apply the timing advance adjustment based at least in part on the indication of the single timing advance received from the base station.

In some aspects, in the single DCI framework, TRP operations may be transparent to the UE. In some aspects, the base station associated with the first TRP or the second TRP may configure the UE with a single timing advance, regardless of a quantity of active multi-TRPs and regardless of a duplexing mode. For example, the base station may configure the UE with the single timing advance for two different TRPs. However, since a propagation delay may be different between the two different TRPs, the single timing advance may cause self-interference at the UE. A downlink timing may be associated with a first TRP and an uplink timing may be associated with a second TRP, which may result in the self-interference at the UE. In some aspects, the UE may apply the timing advance adjustment based at least in part on the single timing advance configured by the base station.

In some aspects, in the single-DCI framework, the UE may receive, from the base station associated with the first TRP or the second TRP, an indication of a timing advance delta value that is less than a cyclic prefix associated with each of the downlink transmission and the uplink transmission. The timing advance delta value may adjust (e.g., reduce or increase) an amount of time associated with the timing advance adjustment. In some aspects, the UE may apply the timing advance delta value during the timing advance adjustment associated with the uplink transmission. The uplink transmission may be associated with an uplink channel repetition, such as a PUSCH/PUCCH repetition. The timing advance delta value may be based at least in part on the uplink channel repetition order. In some aspects, the UE may receive the indication of the timing advance delta value via radio resource control (RRC) signaling, and the UE may receive an update to the timing advance delta value via a MAC-CE. In some aspects, the UE may apply the timing advance adjustment based at least in part on the indication of the timing advance delta value received from the base station.

In some aspects, in the single DCI framework, the timing advance adjustment (e.g., an implicit and relatively small timing advance adjustment) may be based at least in part on a repetition order associated with the first TRP and the second TRP, such as a PUSCH/PUCCH repetition order. For example, to adjust (e.g., reduce or increase) an amount of time needed for the timing advance adjustment, the base station associated with the first TRP or the second TRP may configure the UE with a relatively small timing advance delta (TA_delta). The timing advance delta may be less than a cyclic prefix. The UE may apply the timing advance delta for inter-slot PUSCH/PUCCH repetitions. For example, for a repetition order where a first PUSCH/PUCCH repetition is targeted toward a first TRP and a second PUSCH/PUCCH repetition is targeted toward a second TRP, the UE may apply a timing advance for the first PUSCH/PUCCH repetition and a timing advance plus or minus the timing advance delta for the second PUSCH/PUCCH repetition.

In some aspects, in the single DCI framework, the timing advance delta may be updated periodically via a MAC-CE, and updates to the timing advance delta may be slower as compared to regular timing advance adjustments. Further, when the UE moves further from one TRP and closer to another TRP, a MAC-CE may be used to update the timing advance delta (e.g., change from a positive timing advance delta to a negative timing advance delta).

In some aspects, in the single DCI framework, the timing advance adjustment may be a one-shot timing advance adjustment based at least in part on an uplink channel repetition order. The one-shot timing advance adjustment may be based at least in part on a plus or minus timing advance delta value and the uplink channel repetition order. The timing advance delta value may be based at least in part on the uplink-downlink misalignment between the downlink transmission and the uplink transmission and a current timing advance value.

In some aspects, in the single DCI framework, a one-shot timing advance adjustment may be based at least in part on a repetition order, such as a PUSCH/PUCCH repetition order. The repetition order may correspond to a target TRP, such as the second TRP. The UE may autonomously (e.g., without receiving a MAC-CE from the base station associated with the first TRP or the second TRP) apply a one-shot timing advance adjustment based at least in part on the repetition order. The one-shot timing adjustment may involve applying a plus or minus timing advance delta. The timing advance delta may be based at least in part on an uplink-downlink misalignment at the UE and the current timing advance value.

In some aspects, the full-duplex multi-TRP configuration may be associated with a multi-DCI framework. The UE may receive, from the base station associated with the first TRP or the second TRP, a first timing advance value and a second timing advance value. The first timing advance value may be associated with a first CORESET pool index value and the second timing advance value may be associated with a second CORESET pool index value. The first CORESET pool index value may be associated with the first TRP and the second CORESET pool index value may be associated with the second TRP. In some aspects, a difference between the first timing advance value and the second timing advance value may be based at least in part on a UE capability. The first timing advance value and the second timing advance value may be selected to reduce the downlink-uplink misalignment between the downlink transmission and the uplink transmission. In some aspects, the UE may apply the timing advance adjustment based at least in part on the first timing advance value and the second timing advance value received from the base station.

In some aspects, in the multi-DCI framework, TRP differentiation at a UE may be based at least in part on the CORESET pool index. In some aspects, the base station associated with the first TRP or the second TRP may configure the UE with multiple timing advance values, where each timing advance value may be associated with a CORESET pool index. The base station may jointly adjust timing advance values for multiple TRPs to minimize inter-cell interference between uplinks at a receiving TRP and to minimize a downlink-uplink misalignment at the UE. Minimizing the downlink-uplink misalignment at the UE may reduce self-interference at the UE. Further, a maximum allowed difference between configured timing advances may be based at least in part on a UE capability. In some aspects, the UE may apply the timing advance adjustment based at least in part on the multiple timing advance values configured by the base station.

In some aspects, in the multi-DCI framework, the UE may receive, from the base station associated with the first TRP or the second TRP, an indication of a timing advance delta value associated with the second TRP. The timing advance delta value may be less than a cyclic prefix associated with each of the downlink transmission and the uplink transmission. The timing advance delta value may adjust (e.g., reduce or increase) an amount of time associated with the timing advance adjustment. The UE may apply the timing advance delta value during the timing advance adjustment associated with the uplink transmission to the second TRP.

The timing advance delta value associated with the second TRP may be applied in a full-duplex slot when an uplink is scheduled on the second TRP. In some aspects, the UE may apply the timing advance adjustment based at least in part on the indication of the timing advance delta value received from the base station.

In some aspects, in the multi-DCI framework, the timing advance adjustment may be based at least in part on a duplexing mode, such as a full-duplex multi-TRP mode. For example, to adjust (e.g., reduce or increase) an amount of time needed for the timing advance adjustment, a base station associated with the first TRP or the second TRP may configure (e.g., via RRC signaling) a UE with a timing advance delta value (TA_delta_j) for each TRP. The timing adjustment value may be less than a cyclic prefix. The UE may apply the timing advance delta value (TA_delta_j) in full-duplex slots when an uplink is scheduled on a target TRP (TRP_j). The timing advance delta value may be updated periodically via a MAC-CE, and updates to the timing advance delta value may be slower as compared to regular timing advance adjustments. The timing advance delta value may be selected to reduce a downlink-uplink misalignment at the UE in full-duplex slots.

In some aspects, in the multi-DCI framework, the timing advance adjustment may be a one-shot timing advance adjustment based at least in part on a target TRP. The target TRP may be the second TRP, since the second TRP may receive the PUSCH transmission from the UE. The one-shot timing advance adjustment may be based at least in part on a plus or minus timing advance delta value and the target TRP. The timing advance delta value may be based at least in part on the uplink-downlink misalignment between the downlink transmission and the uplink transmission and the current timing advance value.

In some aspects, in the multi-DCI framework, a one-shot timing advance adjustment may be based at least in part on a target TRP (TRP_j). The UE may autonomously (e.g., without receiving a MAC-CE from a base station) apply a one-shot timing advance adjustment based at least in part on the target TRP. The one-shot timing adjustment may involve applying a plus or minus timing advance delta (TA_delta_j). The timing advance delta may be based at least in part on an uplink-downlink misalignment at the UE and the current timing advance value. The one-shot timing adjustment may be used to minimize the uplink-downlink misalignment in full-duplex slots.

At 1506, the UE may perform an uplink transmission to the second TRP. The second TRP may be associated with a second cell or a second base station. The second TRP may be included in the full-duplex multi-TRP configuration. The uplink transmission may be a PUSCH transmission. From a perspective of the second TRP, the second TRP may perform a PUSCH reception. In some aspects, the UE may perform the uplink transmission based at least in part on the timing advance adjustment associated with the uplink transmission.

As indicated above, FIG. 15 is provided as an example. Other examples may differ from what is described with regard to FIG. 15.

Figure 16:
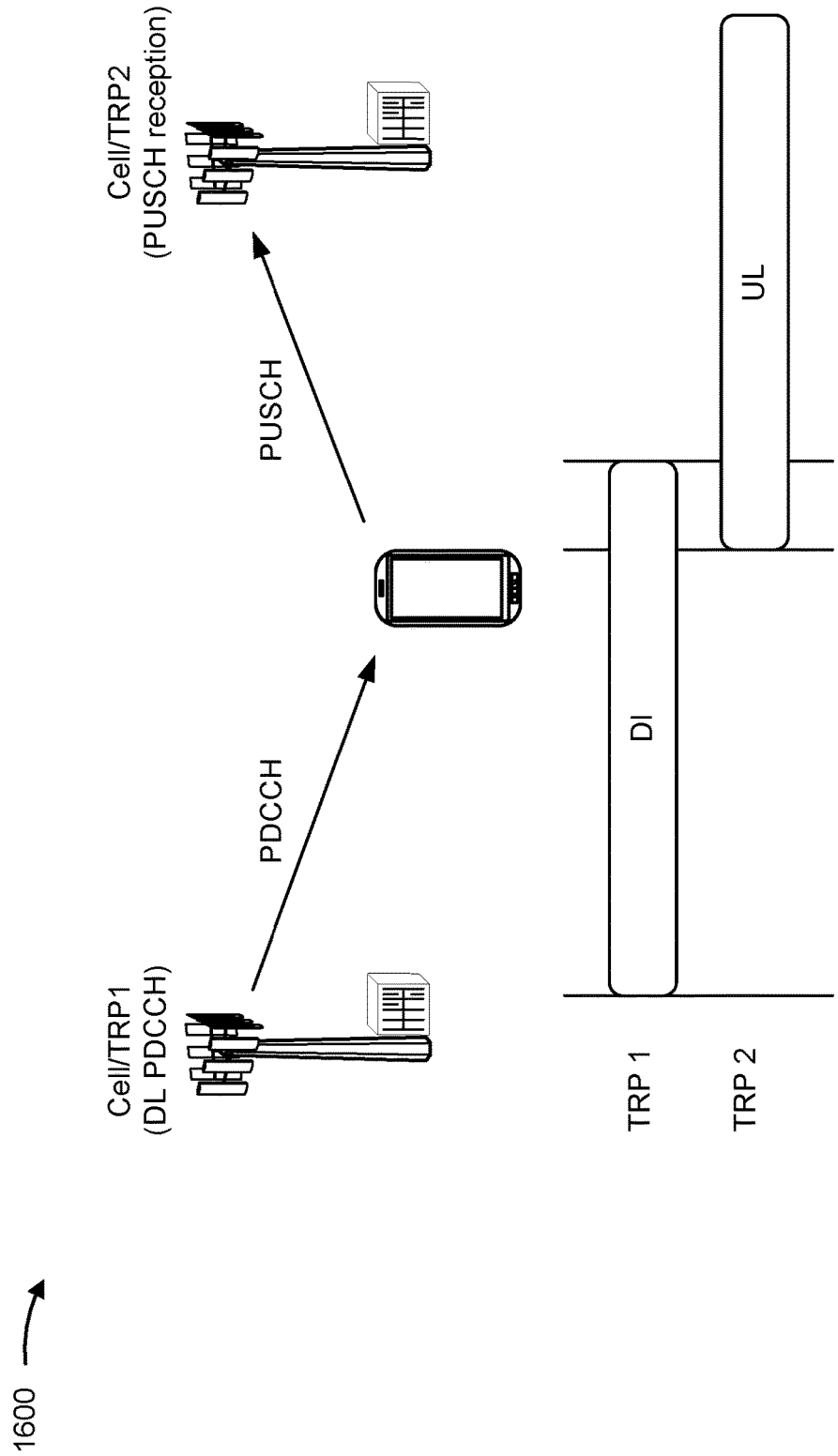
FIG. 16 is a diagram illustrating an example associated with a timing of a full-duplex multi-TRP operation.

FIG. 16 is a diagram illustrating an example 1600 associated with a timing of a full-duplex multi-TRP operation. A first TRP associated with a first cell may transmit a PDCCH to a UE, such as a full-duplex UE. The UE may transmit a PUSCH to a second TRP associated with a second cell. The first TRP may be associated with a PDCCH transmission, and the second TRP may be associated with a PUSCH reception. The UE may receive the PDCCH from the first TRP and transmit the PUSCH to the second TRP without collision between the PDCCH and the PUSCH at the UE.

In some aspects, in full-duplex multi-TRP operation, a base station associated with the first TRP may dynamically indicate to the UE to set a fixed offset (e.g., $N_{TA,offset}$) used to calculate a timing advance to zero or a relatively small value based at least in part on a full-duplex multi-TRP scheduling. The base station may dynamically indicate that the fixed offset is set to zero or the relatively small value based at least in part on whether the PDCCH transmission followed by the PUSCH reception is associated with two different TRPs. Further, a timing advance value may ensure that the PUSCH reception may not interference with a next PDCCH transmission.

In some aspects, in the full-duplex multi-TRP operation, a guard symbol when switching from a downlink to an uplink may be eliminated for the UE, when a PDCCH transmission (e.g., every PDCCH transmission) followed by a PUSCH reception is scheduled on two different TRPs. Typically, the guard symbol may be needed to switch from the downlink to the uplink due to the timing advance in TDD operation. When the fixed offset (e.g., $N_{TA,offset}$) is set to zero or the relatively small value for the full-duplex multi-TRP operation in which the PDCCH transmission followed by the PUSCH reception is scheduled on the two different TRPs, the guard symbol may be eliminated. Further, the UE may not need the guard symbol due to no switching from downlink slots/symbols to uplink slots/symbols.

In some aspects, reducing a misalignment between the PDCCH transmission and the PUSCH reception may reduce a self-interference at the UE. An overlap between the PDCCH transmission and the PUSCH reception may be greater than a cyclic prefix associated with the PDCCH transmission and the PUSCH reception.

As indicated above, FIG. 16 is provided as an example. Other examples may differ from what is described with regard to FIG. 16.

Figure 17:
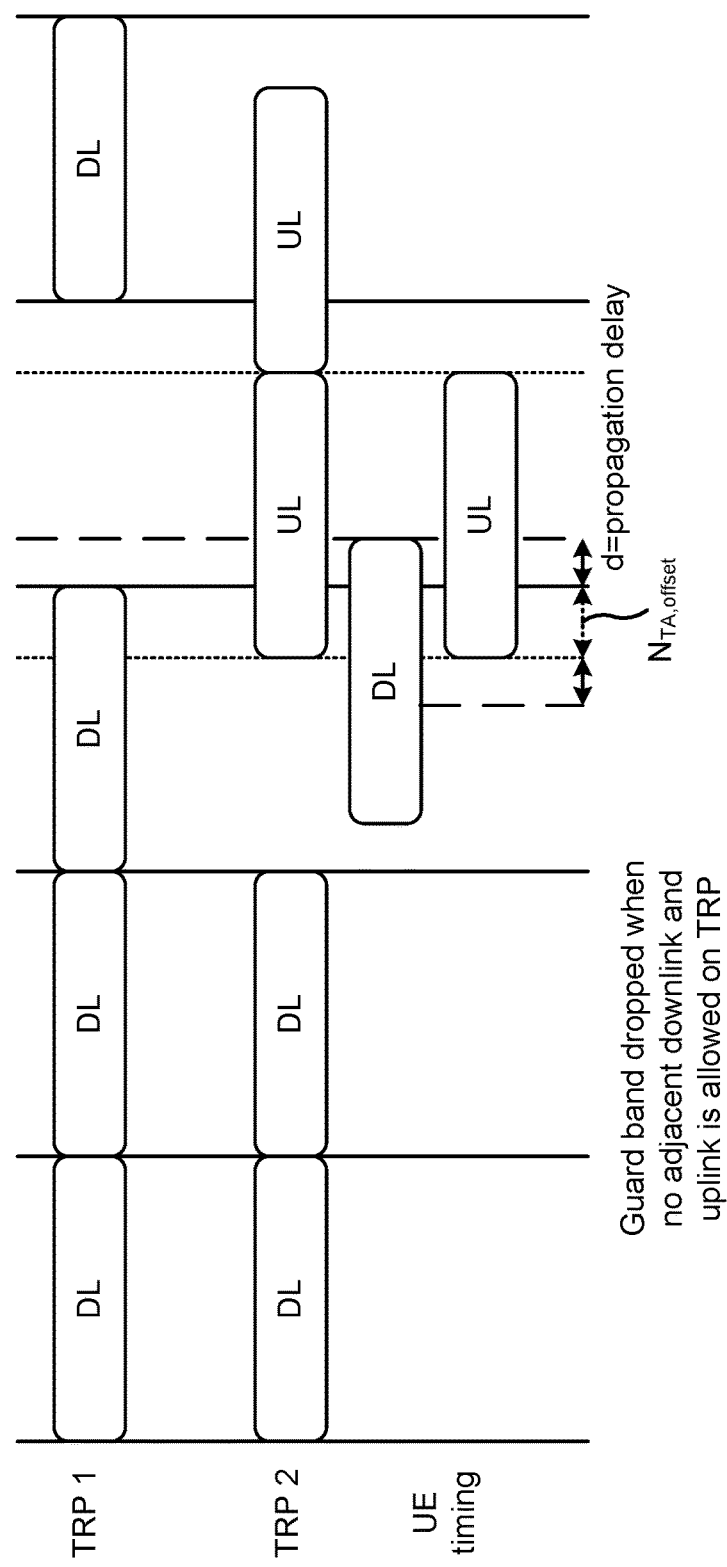
FIG. 17 is a diagram illustrating an example associated with a valid configuration for a UE and full-duplex multi-TRP operation.

FIG. 17 is a diagram illustrating an example associated with a valid configuration for a UE (e.g., a full-duplex UE) and full-duplex multi-TRP operation. A slot format may be downlink, downlink, downlink, uplink, and downlink plus uplink. A first TRP may perform a plurality of downlink transmissions (e.g., PDCCH transmissions) to the UE. A second TRP may perform a plurality of downlink transmissions (e.g., PDCCH transmissions) to the UE and a plurality of uplink receptions (e.g., PUSCH receptions) based at least in part on PUSCH transmissions received from the UE. From a UE timing perspective, the UE may receive a downlink transmission from the first TRP and subsequently perform an uplink transmission to the second TRP. In this case, a guard symbol may be eliminated when switching from a downlink to an uplink, since the downlink transmission and the uplink transmission may be associated with two different TRPs. The guard symbol may be dropped even though the downlink transmission and the uplink transmission may overlap in time, since the downlink transmission and the uplink transmission are associated with the two different TRPs. The guard symbol may be dropped when no adjacent uplink and downlink transmissions are allowed on a particular TRP. Since neither the first TRP or the second TRP perform adjacent uplink and downlink transmissions, the guard symbol may be dropped.

As indicated above, FIG. 17 is provided as an example. Other examples may differ from what is described with regard to FIG. 17.

Figure 18:
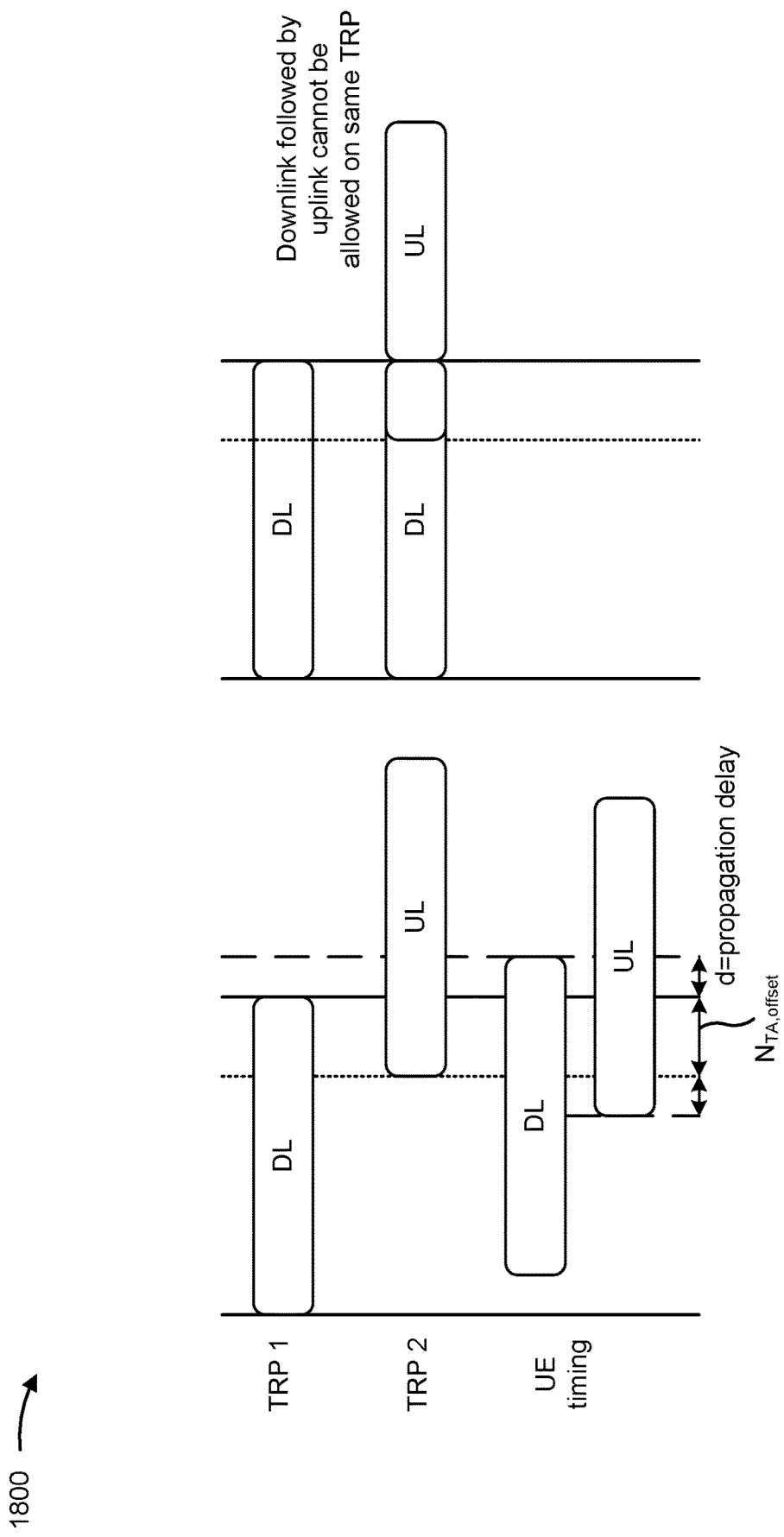
FIG. 18 is a diagram illustrating an example associated with a valid configuration for a UE and full-duplex multi-TRP operation.

FIG. 18 is a diagram illustrating an example associated with a valid configuration for a UE (e.g., a full-duplex UE)

and full-duplex multi-TRP operation. A slot format may be downlink, uplink, downlink, and uplink. A first TRP may perform a plurality of downlink transmissions (e.g., PDCCH transmissions) to the UE. A second TRP may perform a downlink transmission (e.g., a PDCCH transmission) to the UE and a plurality of uplink receptions (e.g., PUSCH receptions) based at least in part on PUSCH transmissions received from the UE. In this case, the second TRP may perform a downlink transmission and a subsequent uplink reception, so a guard band cannot be eliminated between the downlink transmission and the subsequent uplink reception. Since a downlink cannot be followed by an uplink on a same TRP, the guard symbol may not be eliminated when switching from the downlink to the uplink. In other words, since the second TRP performs adjacent uplink and downlink transmissions, the guard symbol may not be dropped. The guard symbol may not be dropped when the downlink and the uplink are configured using the same TRP.

As indicated above, FIG. 18 is provided as an example. Other examples may differ from what is described with regard to FIG. 18.

Figure 19:
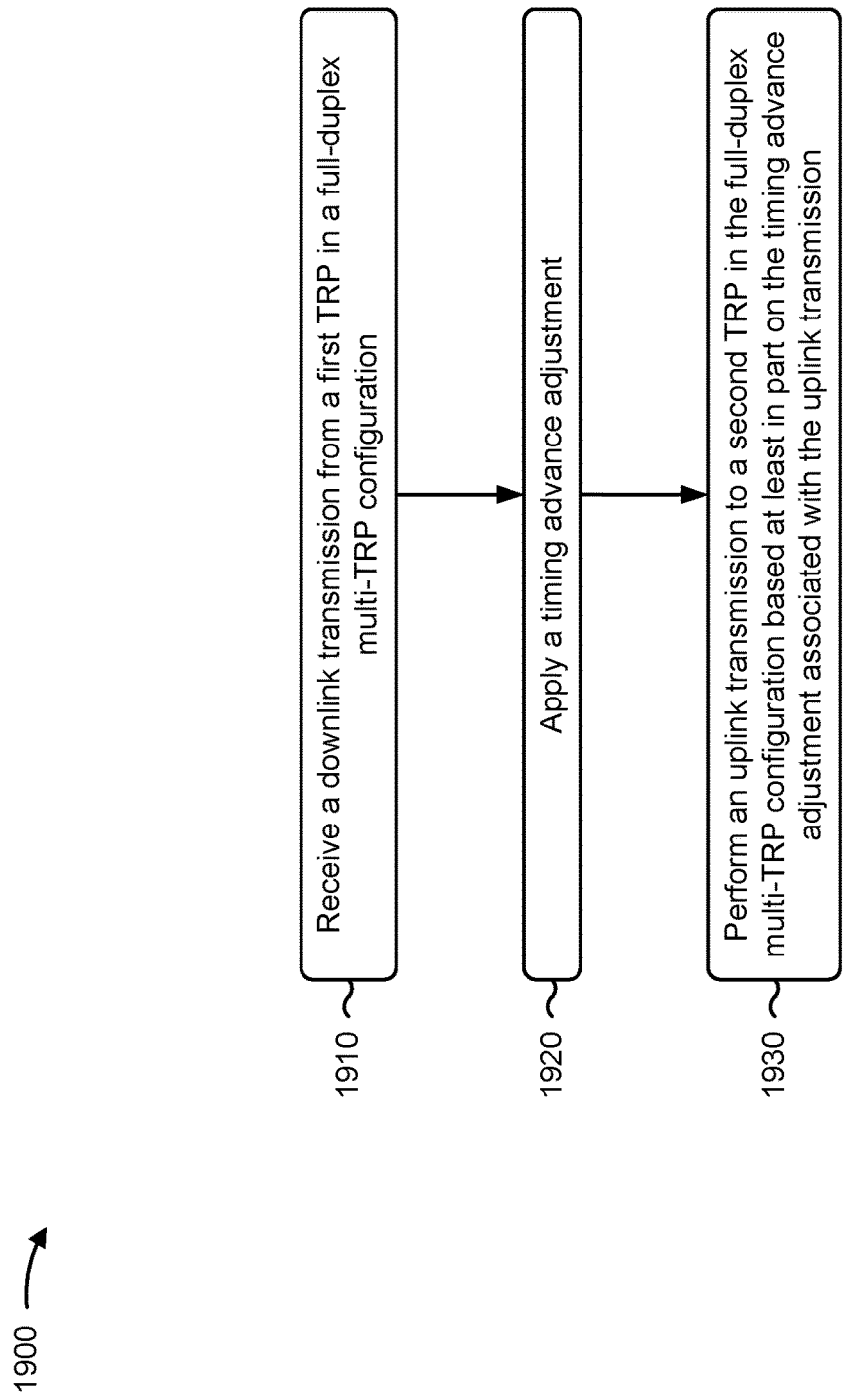
FIG. 19 is a flowchart of an example method of wireless communication.

FIG. 19 is a flowchart of an example method 1900 of wireless communication. The method 1900 may be performed by, for example, a UE (e.g., UE 120). The UE may be a full-duplex UE.

At 1910, the UE may receive a downlink transmission from a first TRP in a full-duplex multi-TRP configuration. For example, the UE (e.g., using communication manager 140 and/or reception component 2002, depicted in FIG. 20) may receive a downlink transmission from a first TRP in a full-duplex multi-TRP configuration, as described above in connection with, for example, FIG. 15 and at 1502. The downlink transmission may be a PDCCH transmission. The first TRP may be associated with a first base station.

At 1920, the UE may apply a timing advance adjustment. For example, the UE (e.g., using communication manager 140 and/or adjustment component 2008, depicted in FIG. 20) may apply the timing advance adjustment, as described above in connection with, for example, FIG. 15 and at 1504. The UE may apply the timing advance adjustment based at least in part on an indication received from a base station associated with the first TRP or the second TRP. Alternatively, the UE may apply the timing advance adjustment as a one-shot autonomous timing advance adjustment based at least in part on an uplink channel repetition order, such as a PUCCH repetition order.

At 1930, the UE may perform an uplink transmission to a second TRP in the full-duplex multi-TRP configuration based at least in part on the timing advance adjustment associated with the uplink transmission. For example, the UE (e.g., using communication manager 140 and/or transmission component 2004, depicted in FIG. 20) may perform an uplink transmission to a second TRP in the full-duplex multi-TRP configuration based at least in part on a timing advance adjustment associated with the uplink transmission, as described above in connection with, for example, FIG. 15 and at 1506. The uplink transmission may be a PUSCH transmission. The second TRP may be associated with a second base station.

In some aspects, the UE may receive, from the base station, an indication to set a timing advance offset to a value that satisfies a threshold value based at least in part on the downlink transmission and the uplink transmission being associated with two different TRPs. In some aspects, the downlink transmission and the uplink transmission are not separated by a guard symbol based at least in part on the downlink transmission and the uplink transmission being associated with the two different TRPs.

In some aspects, a downlink-uplink misalignment between the downlink transmission and the uplink transmission is less than a cyclic prefix length. In some aspects, the full-duplex multi-TRP configuration is associated with a single downlink control information framework. In some aspects, full-duplex multi-TRP configuration is associated with a multi-DCI framework. In some aspects, method 1900 includes receiving, from a base station, an indication of a single timing advance for the full-duplex multi-TRP configuration. The single timing advance is associated with the first TRP and the second TRP.

In some aspects, method 1900 includes receiving, from a base station, an indication of a timing advance delta value that is less than a cyclic prefix associated with each of the downlink transmission and the uplink transmission. The timing advance delta value is based at least in part on an uplink channel repetition order and reduces an amount of time associated with the timing advance adjustment. In some aspects, method 1900 includes applying the timing advance delta value during the timing advance adjustment associated with the uplink transmission. The uplink transmission is associated with an uplink channel repetition. The timing advance delta value is based at least in part on an uplink channel repetition order. In some aspects, method 1900 includes receiving the indication via RRC signaling. In some aspects, method 1900 includes receiving an update to the timing advance delta value via a MAC-CE.

In some aspects, the timing advance adjustment is a one-shot timing advance adjustment based at least in part on an uplink channel repetition order. The one-shot timing advance adjustment is based at least in part on a plus or minus timing advance delta value and the uplink channel repetition order. The timing advance delta value is based at least in part on an uplink-downlink misalignment between the downlink transmission and the uplink transmission and a current timing advance value.

In some aspects, method 1900 includes receiving, from a base station, a first timing advance value and a second timing advance value. The first timing advance value is associated with a first CORESET pool index value and the second timing advance value is associated with a second CORESET pool index value. The first CORESET pool index value is associated with the first TRP and the second CORESET pool index value is associated with the second TRP. In some aspects, a difference between the first timing advance value and the second timing advance value is based at least in part on a UE capability. The UE capability may indicate a single panel operation or a multi-panel operation. The first timing advance value and the second timing advance value are selected to reduce a downlink-uplink misalignment between the downlink transmission and the uplink transmission.

In some aspects, method 1900 includes receiving, from a base station, an indication of a timing advance delta value associated with the second TRP. The timing advance delta value is less than a cyclic prefix associated with each of the downlink transmission and the uplink transmission. The timing advance delta value adjusts an amount of time associated with the timing advance adjustment. In some aspects, method 1900 includes applying the timing advance delta value during the timing advance adjustment associated with the uplink transmission to the second TRP. The timing advance delta value associated with the second TRP is applied in a full-duplex slot when an uplink is scheduled on the second TRP.

In some aspects, the timing advance adjustment is a one-shot timing advance adjustment based at least in part on a target TRP. The target TRP is the second TRP. The one-shot timing advance adjustment is based at least in part on a plus or minus timing advance delta value and the target TRP. The timing advance delta value is based at least in part on an uplink-downlink misalignment between the downlink transmission and the uplink transmission and a current timing advance value.

Although FIG. 19 shows example blocks of method 1900, in some aspects, method 1900 may include additional blocks, fewer blocks, different blocks, or differently arranged blocks than those depicted in FIG. 19. Additionally, or alternatively, two or more of the blocks of method 1900 may be performed in parallel.

Figure 20:
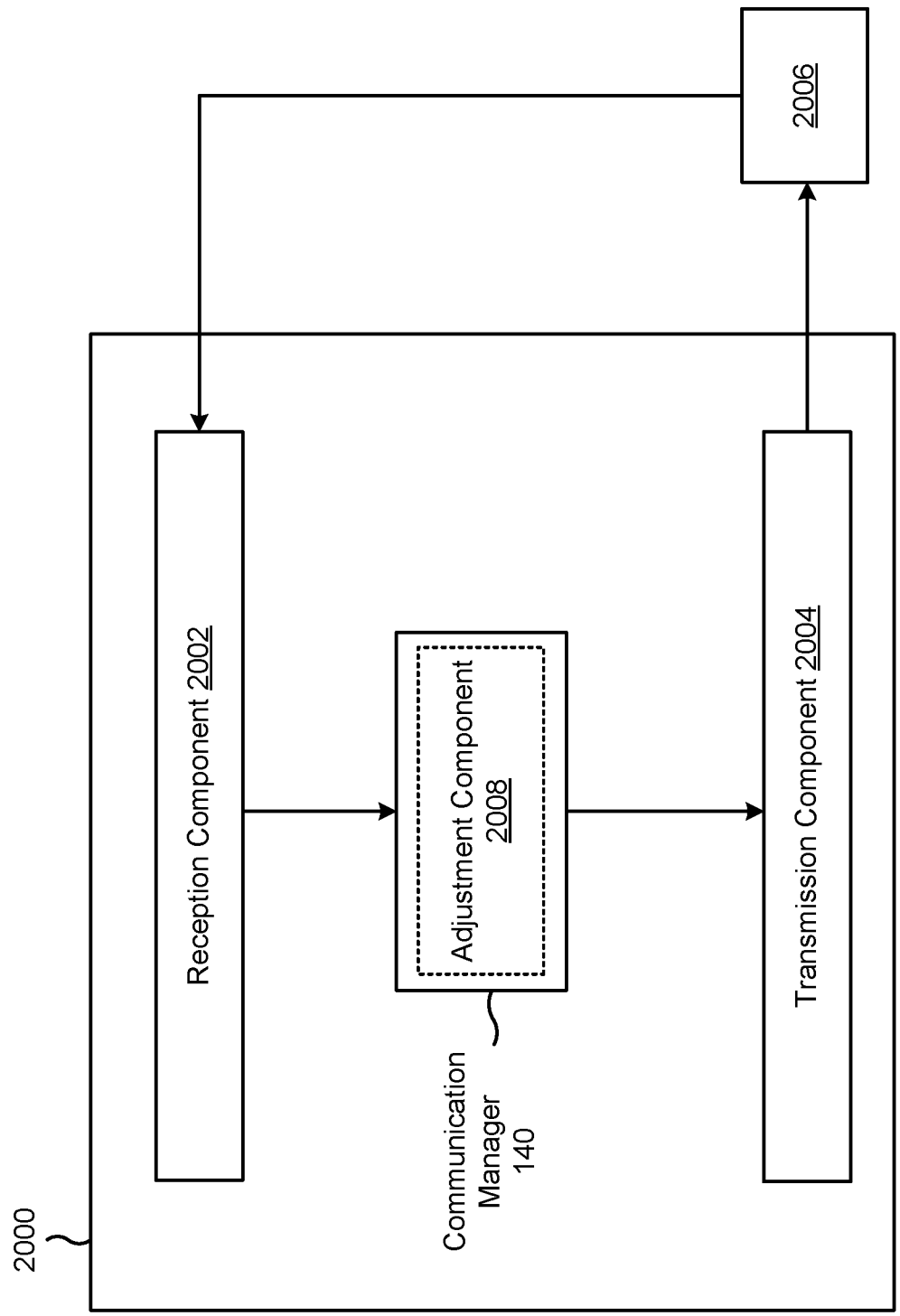
FIG. 20 is a block diagram of an example apparatus for wireless communication.

FIG. 20 is a block diagram of an example apparatus 2000 for wireless communication. The apparatus 2000 may be a UE, or a UE may include the apparatus 2000. In some aspects, the apparatus 2000 includes a reception component 2002 and a transmission component 2004, which may be in communication with one another (for example, via one or more buses and/or one or more other components). As shown, the apparatus 2000 may communicate with another apparatus 2006 (such as a UE, a base station, or another wireless communication device) using the reception component 2002 and the transmission component 2004. As further shown, the apparatus 2000 may include the communication manager 140. The communication manager 140 may include an adjustment component 2008, among other examples.

In some aspects, the apparatus 2000 may be configured to perform one or more operations described herein in connection with FIGS. 15-18. Additionally, or alternatively, the apparatus 2000 may be configured to perform one or more processes described herein, such as process 1900 of FIG. 19. In some aspects, the apparatus 2000 and/or one or more components shown in FIG. 20 may include one or more components of the UE described in connection with FIG. 2. Additionally, or alternatively, one or more components shown in FIG. 20 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2002 may receive communications, such as reference signals, control information, data communications, or a combination thereof, from the apparatus 2006. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2006. In some aspects, the reception component 2002 may include one or more antennas, a demodulator, a MIMO detector, a receive processor, a controller/processor, a memory, or a combination thereof, of the UE described in connection with FIG. 2.

The transmission component 2004 may transmit communications, such as reference signals, control information, data communications, or a combination thereof, to the apparatus 2006. In some aspects, one or more other components of the apparatus 2006 may generate communications and may provide the generated communications to the transmission component 2004 for transmission to the apparatus 2006. In some aspects, the transmission component 2004 may perform signal processing on the generated communications (such as filtering, amplification, modulation, digital-to-analog conversion, multiplexing, interleaving, mapping, or encoding, among other examples), and may transmit the processed signals to the apparatus 2006. In some aspects, the transmission component 2004 may include one or more antennas, a modulator, a transmit MIMO processor, a transmit processor, a controller/processor, a memory, or a combination thereof, of the UE described in connection with FIG. 2. In some aspects, the transmission component 2004 may be co-located with the reception component 2002 in a transceiver.

The reception component 2002 may receive a downlink transmission from a first TRP in a full-duplex multi-TRP configuration. The transmission component 2004 may perform an uplink transmission to a second TRP in the full-duplex multi-TRP configuration based at least in part on a timing advance adjustment associated with the uplink transmission. The reception component 2002 may receive, from a base station, an indication to set a timing advance offset to a value that satisfies a threshold value based at least in part on the downlink transmission and the uplink transmission being associated with two different TRPs. The reception component 2002 may receive, from a base station, an indication of a single timing advance for the full-duplex multi-TRP configuration, wherein the single timing advance is associated with the first TRP and the second TRP.

The reception component 2002 may receive, from a base station, an indication of a timing advance delta value that is less than a cyclic prefix associated with each of the downlink transmission and the uplink transmission. The timing advance delta value may be based at least in part on an uplink channel repetition order and adjust an amount of time associated with the timing advance adjustment. The adjustment component 2008 may apply the timing advance delta value during the timing advance adjustment associated with the uplink transmission, wherein the uplink transmission is associated with an uplink channel repetition.

The reception component 2002 may receive, from a base station, a first timing advance value and a second timing advance value. The first timing advance value may be associated with a first CORESET pool index value and the second timing advance value is associated with a second CORESET pool index value. The first CORESET pool index value may be associated with the first TRP and the second CORESET pool index value is associated with the second TRP.

The reception component 2002 may receive, from a base station, an indication of a timing advance delta value associated with the second TRP. The timing advance delta value may be less than a cyclic prefix associated with each of the downlink transmission and the uplink transmission. The timing advance delta value may adjust an amount of time associated with the timing advance adjustment. The adjustment component 2008 may apply the timing advance delta value during the timing advance adjustment associated with the uplink transmission to the second TRP. The timing advance delta value associated with the second TRP may be applied in a full-duplex slot when an uplink is scheduled on the second TRP.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of (one or more) components shown in FIG. 20 may perform one or more functions described as being performed by another set of components shown in FIG. 20.

Figure 21:
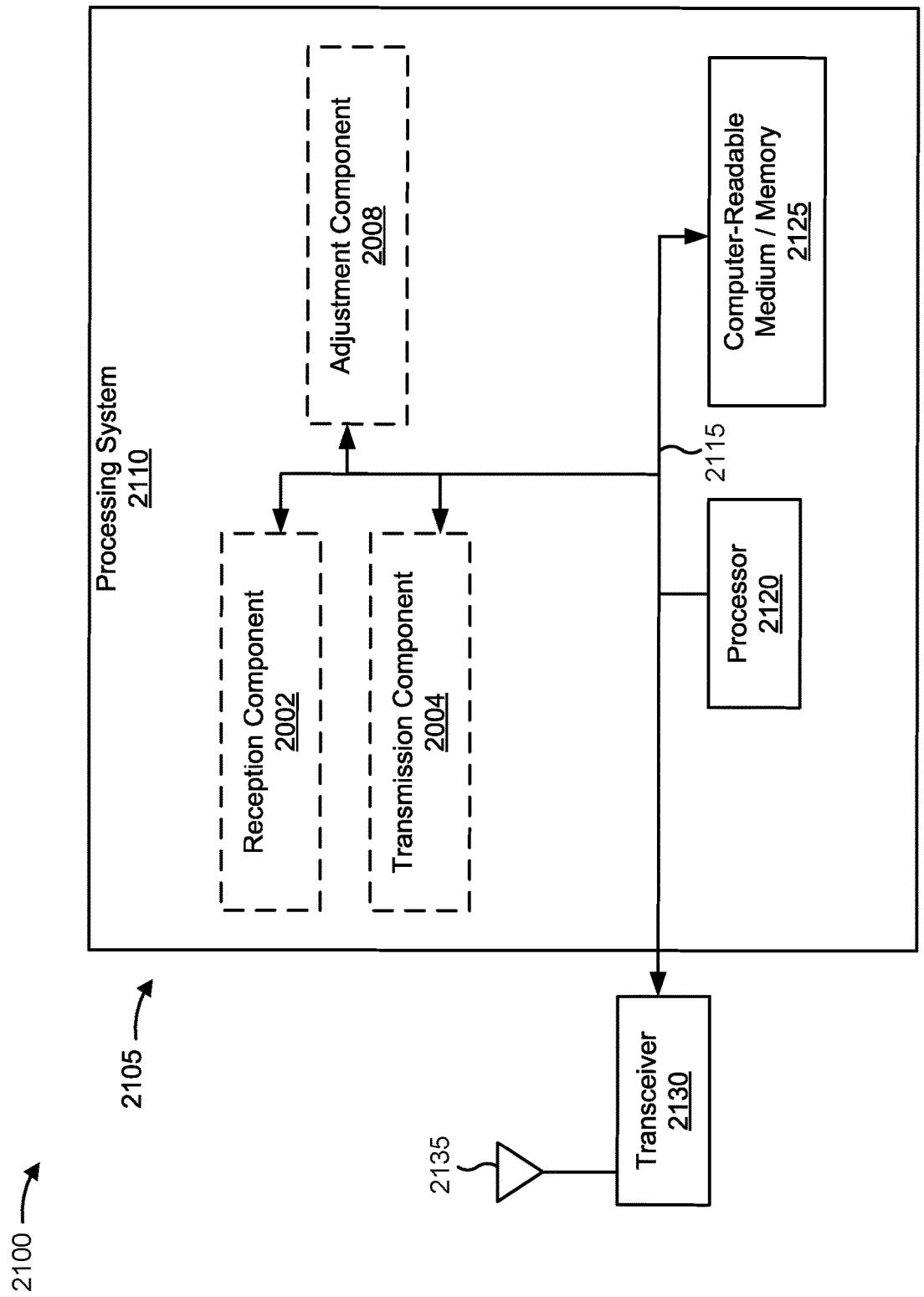
FIG. 21 is a diagram illustrating an example of a hardware implementation for an apparatus employing a processing system.

FIG. 21 is a diagram illustrating an example 2100 of a hardware implementation for an apparatus 2105 employing a processing system 2110. The apparatus 2105 may be a UE.

The processing system 2110 may be implemented with a bus architecture, represented generally by the bus 2115. The bus 2115 may include any number of interconnecting buses and bridges depending on the specific application of the processing system 2110 and the overall design constraints. The bus 2115 links together various circuits including one or more processors and/or hardware components, represented by the processor 2120, the illustrated components, and the computer-readable medium/memory 2125. The bus 2115 may also link various other circuits, such as timing sources, peripherals, voltage regulators, and/or power management circuits.

The processing system 2110 may be coupled to a transceiver 2130. The transceiver 2130 is coupled to one or more antennas 2135. The transceiver 2130 provides a means for communicating with various other apparatuses over a transmission medium. The transceiver 2130 receives a signal from the one or more antennas 2135, extracts information from the received signal, and provides the extracted information to the processing system 2110, specifically the reception component 2002. In addition, the transceiver 2130 receives information from the processing system 2110, specifically the transmission component 2004, and generates a signal to be applied to the one or more antennas 2135 based at least in part on the received information.

The processing system 2110 includes a processor 2120 coupled to a computer-readable medium/memory 2125. The processor 2120 is responsible for general processing, including the execution of software stored on the computer-readable medium/memory 2125. The software, when executed by the processor 2120, causes the processing system 2110 to perform the various functions described herein for any particular apparatus. The computer-readable medium/memory 2125 may also be used for storing data that is manipulated by the processor 2120 when executing software. The processing system further includes at least one of the illustrated components. The components may be software modules running in the processor 2120, resident/stored in the computer readable medium/memory 2125, one or more hardware modules coupled to the processor 2120, or some combination thereof.

In some aspects, the processing system 2110 may be a component of the UE 120 and may include the memory 282 and/or at least one of the TX MIMO processor 266, the RX processor 258, and/or the controller/processor 280. In some aspects, the apparatus 2105 for wireless communication includes means for receiving a downlink transmission from a first TRP in a full-duplex multi-TRP configuration; and/or means for performing an uplink transmission to a second TRP in the full-duplex multi-TRP configuration based at least in part on a timing advance adjustment associated with the uplink transmission. The aforementioned means may be one or more of the aforementioned components of the apparatus 2000 and/or the processing system 2110 of the apparatus 2105 configured to perform the functions recited by the aforementioned means. As described elsewhere herein, the processing system 2110 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 21 is provided as an example. Other examples may differ from what is described in connection with FIG. 21.

The following provides an overview of some Aspects of the present disclosure:

Aspect 1: A method of wireless communication performed by a user equipment (UE), comprising: receiving a downlink transmission from a first transmit-receive point (TRP) in a full-duplex multi-TRP configuration; and performing an uplink transmission to a second TRP in the full-duplex multi-TRP configuration based at least in part on a timing advance adjustment associated with the uplink transmission.

Aspect 2: The method of Aspect 1, further comprising: receiving, from a base station, an indication to set a timing advance offset to a value that satisfies a threshold value based at least in part on the downlink transmission and the uplink transmission being associated with two different TRPs, wherein a setting of the timing advance offset is associated with the timing advance adjustment.

Aspect 3: The method of Aspect 2, wherein the downlink transmission and the uplink transmission are not separated by a guard symbol based at least in part on the downlink transmission and the uplink transmission being associated with the two different TRPs.

Aspect 4: The method of any of Aspects 1 through 3, wherein a downlink-uplink misalignment between the downlink transmission and the uplink transmission is less than a cyclic prefix length.

Aspect 5: The method of any of Aspects 1 through 4, wherein: the full-duplex multi-TRP configuration is associated with a single downlink control information (DCI) framework.

Aspect 6: The method of any of Aspects 1 through 5, further comprising: receiving, from a base station, an indication of a single timing advance for the full-duplex multi-TRP configuration, wherein the single timing advance is associated with the first TRP and the second TRP, and wherein the single timing advance is associated with the timing advance adjustment.

Aspect 7: The method of any of Aspects 1 through 6, further comprising: receiving, from a base station, an indication of a timing advance delta value that is less than a cyclic prefix associated with each of the downlink transmission and the uplink transmission, wherein the timing advance delta value is based at least in part on an uplink channel repetition order and adjusts an amount of time associated with the timing advance adjustment; and apply the timing advance delta value during the timing advance adjustment associated with the uplink transmission, wherein the uplink transmission is associated with an uplink channel repetition.

Aspect 8: The method of Aspect 7, wherein the timing advance delta value is based at least in part on an uplink channel repetition order.

Aspect 9: The method of Aspect 7, wherein receiving the indication of the timing advance delta value comprises receiving the indication via radio resource control signaling, and further comprising receiving an update to the timing advance delta value via a medium access control control element.

Aspect 10: The method of any of Aspects 1 through 9, wherein the timing advance adjustment is a one-shot timing advance adjustment based at least in part on an uplink channel repetition order, wherein the one-shot timing advance adjustment is based at least in part on a plus or minus timing advance delta value and the uplink channel repetition order, and wherein the timing advance delta value is based at least in part on an uplink-downlink misalignment between the downlink transmission and the uplink transmission and a current timing advance value.

Aspect 11: The method of any of Aspects 1 through 10, wherein the full-duplex multi-TRP configuration is associated with a multi-downlink control information framework.

Aspect 12: The method of any of Aspects 1 through 11, further comprising: receiving, from a base station, a first timing advance value and a second timing advance value, wherein the first timing advance value is associated with a first control resource set (CORESET) pool index value and the second timing advance value is associated with a second CORESET pool index value, wherein the first CORESET pool index value is associated with the first TRP and the second CORESET pool index value is associated with the second TRP, and wherein the first timing advance value and the second timing advance value are associated with the timing advance adjustment.

Aspect 13: The method of Aspect 12, wherein a difference between the first timing advance value and the second timing advance value is based at least in part on a UE capability, wherein the UE capability indicates a single panel operation or a multi-panel operation, and wherein the first timing advance value and the second timing advance value are selected to reduce a downlink-uplink misalignment between the downlink transmission and the uplink transmission.

Aspect 14: The method of any of Aspects 1 through 13, further comprising: receiving, from a base station, an indication of a timing advance delta value associated with the second TRP, wherein the timing advance delta value is less than a cyclic prefix associated with each of the downlink transmission and the uplink transmission, wherein the timing advance delta value adjusts an amount of time associated with the timing advance adjustment; and apply the timing advance delta value during the timing advance adjustment associated with the uplink transmission to the second TRP, wherein the timing advance delta value associated with the second TRP is applied in a full-duplex slot when an uplink is scheduled on the second TRP.

Aspect 15: The method of any of Aspects 1 through 14, wherein the timing advance adjustment is a one-shot timing advance adjustment based at least in part on a target TRP, wherein the target TRP is the second TRP, wherein the one-shot timing advance adjustment is based at least in part on a plus or minus timing advance delta value and the target TRP, and wherein the timing advance delta value is based at least in part on an uplink-downlink misalignment between the downlink transmission and the uplink transmission and a current timing advance value.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, wherein the one or more processors are configured to:
receive a downlink transmission from a first transmit-receive point (TRP) in a full-duplex multi-TRP configuration;
receive, based at least in part on the downlink transmission being associated with a different TRP than an uplink transmission, an indication associated with a timing advance offset;
apply a timing advance adjustment based at least in part on the indication, a downlink-uplink misalignment between the downlink transmission and the uplink transmission being less than a cyclic prefix length based at least in part on the timing advance adjustment; and
perform the uplink transmission to a second TRP in the full-duplex multi-TRP configuration based at least in part on the timing advance adjustment.

2. The UE of claim 1, wherein the timing advance offset is a value that satisfies a threshold value.

3. The UE of claim 1, wherein the downlink transmission and the uplink transmission are not separated by a guard symbol based at least in part on the downlink transmission being associated with a different TRP than the uplink transmission.

4. The UE of claim 1, wherein the full-duplex multi-TRP configuration is associated with a single downlink control information framework.

5. The UE of claim 1, wherein the one or more processors are further configured to:
receive an indication of a single timing advance for the full-duplex multi-TRP configuration, wherein the single timing advance is associated with the first TRP and the second TRP, and wherein the single timing advance is associated with the timing advance adjustment.

6. The UE of claim 1, wherein the one or more processors are further configured to:
receive an indication of a timing advance delta value that is less than a cyclic prefix associated with each of the downlink transmission and the uplink transmission, wherein the timing advance delta value adjusts an amount of time associated with the timing advance adjustment; and
apply the timing advance delta value during the timing advance adjustment, wherein the uplink transmission is associated with an uplink channel repetition.

7. The UE of claim 6, wherein the timing advance delta value is based at least in part on an uplink channel repetition order.

8. The UE of claim 6, wherein:
the one or more processors, to receive the indication of the timing advance delta value, are configured to receive the indication of the timing advance delta value via radio resource control signaling; and
the one or more processors are further configured to receive an update to the timing advance delta value via a medium access control-control element (MAC-CE).

9. The UE of claim 1, wherein the timing advance adjustment is a one-shot timing advance adjustment based at least in part on an uplink channel repetition order, wherein the one-shot timing advance adjustment is based at least in part on a plus or minus timing advance delta value and the uplink channel repetition order, and wherein the timing advance delta value is based at least in part on the downlink-uplink misalignment and a current timing advance value.

10. The UE of claim 1, wherein the full-duplex multi-TRP configuration is associated with a multi-downlink control information framework.

11. The UE of claim 1, wherein the one or more processors are further configured to:
receive a first timing advance value and a second timing advance value, wherein the first timing advance value is associated with a first control resource set (CORESET) pool index value and the second timing advance value is associated with a second CORESET pool index value, wherein the first CORESET pool index value is associated with the first TRP and the second CORESET pool index value is associated with the second TRP, and wherein the first timing advance value and the second timing advance value are associated with the timing advance adjustment.

12. The UE of claim 11, wherein a difference between the first timing advance value and the second timing advance value is based at least in part on a UE capability, wherein the UE capability indicates a single panel operation or a multi-panel operation, and wherein the first timing advance value and the second timing advance value are selected to reduce the downlink-uplink misalignment.

13. The UE of claim 1, wherein the one or more processors are further configured to:
receive an indication of a timing advance delta value associated with the second TRP, wherein the timing advance delta value is less than a cyclic prefix associated with each of the downlink transmission and the uplink transmission, and wherein the timing advance delta value adjusts an amount of time associated with the timing advance adjustment; and
apply the timing advance delta value during the timing advance adjustment, wherein the timing advance delta value associated with the second TRP is applied in a full-duplex slot when an uplink is scheduled on the second TRP.

14. The UE of claim 1, wherein the timing advance adjustment is a one-shot timing advance adjustment based at least in part on a target TRP, wherein the target TRP is the second TRP, wherein the one-shot timing advance adjustment is based at least in part on a plus or minus timing advance delta value and the target TRP, and wherein the timing advance delta value is based at least in part on the downlink-uplink misalignment.

15. A method of wireless communication performed by a user equipment (UE), comprising:
receiving a downlink transmission from a first transmit-receive point (TRP) in a full-duplex multi-TRP configuration;

receiving, based at least in part on the downlink transmission being associated with a different TRP than an uplink transmission, an indication associated with a timing advance offset;

applying a timing advance adjustment based at least in part on the indication, a downlink-uplink misalignment between the downlink transmission and the uplink transmission being less than a cyclic prefix length based at least in part on the timing advance adjustment; and performing the uplink transmission to a second TRP in the full-duplex multi-TRP configuration based at least in part on the timing advance adjustment.

16. The method of claim 15, wherein the timing advance offset is a value that satisfies a threshold value.

17. The method of claim 15, wherein the downlink transmission and the uplink transmission are not separated by a guard symbol based at least in part on the downlink transmission being associated with a different TRP than the uplink transmission.

18. The method of claim 15, wherein:
the full-duplex multi-TRP configuration is associated with a single downlink control information (DCI) framework; or
the full-duplex multi-TRP configuration is associated with a multi-DCI framework.

19. The method of claim 15, further comprising:
receiving an indication of a single timing advance for the full-duplex multi-TRP configuration, wherein the single timing advance is associated with the first TRP and the second TRP, and wherein the single timing advance is associated with the timing advance adjustment.

20. The method of claim 15, further comprising:
receiving an indication of a timing advance delta value that is less than a cyclic prefix associated with each of the downlink transmission and the uplink transmission, wherein the timing advance delta value is based at least in part on an uplink channel repetition order and adjusts an amount of time associated with the timing advance adjustment; and
applying the timing advance delta value during the timing advance adjustment, wherein the uplink transmission is associated with an uplink channel repetition.

21. The method of claim 20, wherein receiving the indication of the timing advance delta value comprises receiving the indication of the timing advance delta value via radio resource control signaling, and wherein the method further comprises receiving an update to the timing advance delta value via a medium access control control element (MAC-CE).

22. The method of claim 20, wherein the timing advance delta value is based at least in part on an uplink channel repetition order.

23. The method of claim 15, wherein the timing advance adjustment is a one-shot timing advance adjustment based at least in part on an uplink channel repetition order, wherein the one-shot timing advance adjustment is based at least in part on a plus or minus timing advance delta value and the uplink channel repetition order, and wherein the timing advance delta value is based at least in part on the downlink-uplink misalignment and a current timing advance value.

24. The method of claim 15, further comprising:
receiving a first timing advance value and a second timing advance value, wherein the first timing advance value is associated with a first control resource set (CORESET) pool index value and the second timing advance value is associated with a second CORESET pool index value, wherein the first CORESET pool index value is associated with the first TRP and the second CORESET pool index value is associated with the second TRP, and wherein the first timing advance value and the second timing advance value are associated with the timing advance adjustment.

25. The method of claim 24, wherein a difference between the first timing advance value and the second timing advance value is based at least in part on a UE capability, wherein the UE capability indicates a single panel operation or a multi-panel operation, and wherein the first timing advance value and the second timing advance value are selected to reduce the downlink-uplink misalignment.

26. The method of claim 15, further comprising:
receiving an indication of a timing advance delta value associated with the second TRP, wherein the timing advance delta value is less than a cyclic prefix associated with each of the downlink transmission and the uplink transmission, wherein the timing advance delta value adjusts an amount of time associated with the timing advance adjustment; and
applying the timing advance delta value during the timing advance adjustment associated with the uplink transmission to the second TRP, wherein the timing advance delta value associated with the second TRP is applied in a full-duplex slot when an uplink is scheduled on the second TRP.

27. The method of claim 15, wherein the timing advance adjustment is a one-shot timing advance adjustment based at least in part on a target TRP, wherein the target TRP is the second TRP, wherein the one-shot timing advance adjustment is based at least in part on a plus or minus timing advance delta value and the target TRP, and wherein the timing advance delta value is based at least in part on the downlink-uplink misalignment and a current timing advance value.

28. The method of claim 15, wherein the full-duplex multi-TRP configuration is associated with a multi-downlink control information framework.

29. A non-transitory computer-readable medium having a set of instructions stored thereon for wireless communication that, when executed by an apparatus, causes the apparatus to:
receive a downlink transmission from a first transmit-receive point (TRP) in a full-duplex multi-TRP configuration;
receive, based at least in part on the downlink transmission being associated with a different TRP than an uplink transmission, an indication associated with a timing advance offset;
apply a timing advance adjustment based at least in part on the indication, a downlink-uplink misalignment between the downlink transmission and the uplink transmission being less than a cyclic prefix length based at least in part on the timing advance adjustment; and
perform the uplink transmission to a second TRP in the full-duplex multi-TRP configuration based at least in part on the timing advance adjustment.

30. An apparatus for wireless communication, comprising:
means for receiving a downlink transmission from a first transmit-receive point (TRP) in a full-duplex multi-TRP configuration;

means for receiving, based at least in part on the downlink transmission being associated with a different TRP than an uplink transmission, an indication associated with a timing advance offset;

means for applying a timing advance adjustment based at least in part on the indication, a downlink-uplink misalignment between the downlink transmission and the uplink transmission being less than a cyclic prefix length based at least in part on the timing advance adjustment; and means for performing the uplink transmission to a second TRP in the full-duplex multi-TRP configuration based at least in part on the timing advance adjustment.

* * * * *